US012673570B1

(12) United States Patent
Capota et al.

(10) Patent No.: US 12,673,570 B1
(45) Date of Patent: Jul. 7, 2026

(54) MODULAR FACILITIES AND CHARGING CONSOLES FOR AUTONOMOUS GROUND VEHICLES

(71) Applicant: Amazon Technologies, Inc., Seattle, WA (US)

(72) Inventors: Timothy Capota, Kirkland, WA (US); Travis Glover, Seattle, WA (US); Erich Hacker, Seattle, WA (US); Jack Mintz Kaplan, Seattle, WA (US); Khadijah Abdul Latiff, Seattle, WA (US); Samrin Sing, Sammamish, WA (US); Jose Martin Villar Duran, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 911 days.

(21) Appl. No.: 17/898,099

(22) Filed: Aug. 29, 2022

(51) Int. Cl.
| | |
|---|---|
| *B60L 53/30* | (2019.01) |
| *B60L 53/12* | (2019.01) |
| *H02J 7/70* | (2026.01) |
| *H02J 50/10* | (2016.01) |

(52) U.S. Cl.
CPC .............. *B60L 53/30* (2019.02); *B60L 53/12* (2019.02); *H02J 7/751* (2026.01); *H02J 50/10* (2016.02); *H02J 2207/20* (2020.01)

(58) Field of Classification Search
CPC ........ B60L 53/30; B60L 53/12; H02J 7/0045; H02J 50/10; H02J 2207/20
USPC ........................................ 320/107, 108, 109
See application file for complete search history.

(56) References Cited

U.S. PATENT DOCUMENTS

| | | | |
|---|---|---|---|
| 4,865,248 | A | 9/1989 | Barth |
| 4,954,962 | A | 9/1990 | Evans, Jr. et al. |
| 5,040,116 | A | 8/1991 | Evans, Jr. et al. |
| 5,283,739 | A | 2/1994 | Summerville et al. |
| 5,386,462 | A | 1/1995 | Schlamp |
| 5,452,374 | A | 9/1995 | Cullen et al. |

(Continued)

FOREIGN PATENT DOCUMENTS

| | | |
|---|---|---|
| DE | 102011086497 A1 | 5/2013 |
| EP | 1240562 A1 | 9/2002 |

(Continued)

OTHER PUBLICATIONS

Bullock et al., "Analysis of the Use of Digital Road Maps in Vehicle Navigation," 1994, IEEE, p. 494-501 (Year: 1994).

(Continued)

*Primary Examiner* — Richard V Muralidar
(74) *Attorney, Agent, or Firm* — Athorus, PLLC

(57) ABSTRACT

Facilities for accommodating ground vehicles include spaces or enclosures defined by frames, panels and doors mounted to such frames, and charging consoles provided within the spaces or enclosures. Doors may be operated to enable a ground vehicle to enter a space and receive electrical power from a charging console or transfer information or data to external computer systems. Doors may also be operated to enable workers to access the space to inspect the ground vehicle or deposit an item within the ground vehicle. Facilities may include multiple spaces or enclosures for accommodating ground vehicles and may be formed by joining frames to one another and mounting panels or doors to such frames.

20 Claims, 19 Drawing Sheets

(56) References Cited

U.S. PATENT DOCUMENTS

| | | | |
|---|---|---|---|
| 5,497,236 A | 3/1996 | Wolff et al. |
| 5,731,884 A | 3/1998 | Inoue |
| 5,901,253 A | 5/1999 | Tretter |
| 5,995,898 A | 11/1999 | Tuttle |
| 6,031,612 A | 2/2000 | Shirley |
| 6,266,577 B1 | 7/2001 | Popp et al. |
| 6,344,796 B1 | 2/2002 | Ogilvie et al. |
| 6,374,155 B1 | 4/2002 | Wallach et al. |
| 6,426,699 B1 | 7/2002 | Porter |
| 6,507,670 B1 | 1/2003 | Moed |
| 6,543,983 B1 | 4/2003 | Felder et al. |
| 6,636,781 B1 | 10/2003 | Shen et al. |
| 6,690,997 B2 | 2/2004 | Rivalto |
| 6,694,217 B2 | 2/2004 | Bloom |
| 6,705,523 B1 | 3/2004 | Stamm et al. |
| 6,919,803 B2 | 7/2005 | Breed |
| 6,954,290 B1 | 10/2005 | Braudaway et al. |
| 6,961,711 B1 | 11/2005 | Chee |
| 6,965,440 B1 | 11/2005 | Nakagiri et al. |
| 6,970,838 B1 | 11/2005 | Kamath et al. |
| 7,006,952 B1 | 2/2006 | Matsumoto et al. |
| 7,016,536 B1 | 3/2006 | Ling et al. |
| 7,031,519 B2 | 4/2006 | Elmenhurst |
| 7,129,817 B2 | 10/2006 | Yamagishi |
| 7,133,743 B2 | 11/2006 | Tilles et al. |
| 7,145,699 B2 | 12/2006 | Dolan |
| 7,149,611 B2 | 12/2006 | Beck et al. |
| 7,188,513 B2 | 3/2007 | Wilson |
| 7,337,686 B2 | 3/2008 | Sagi-Dolev |
| 7,337,944 B2 | 3/2008 | Devar |
| 7,339,993 B1 | 3/2008 | Brooks et al. |
| 7,459,880 B1 | 12/2008 | Rosen |
| 7,639,386 B1 | 12/2009 | Siegel et al. |
| 7,668,404 B2 | 2/2010 | Adams et al. |
| 7,673,831 B2 | 3/2010 | Steele et al. |
| 7,685,953 B2 | 3/2010 | Giles |
| 7,693,745 B1 | 4/2010 | Pomerantz et al. |
| 7,894,939 B2 | 2/2011 | Zini et al. |
| 7,925,375 B2 | 4/2011 | Schininger et al. |
| 7,946,530 B1 | 5/2011 | Talmage, Jr. |
| 7,966,093 B2 | 6/2011 | Zhuk |
| 8,015,023 B1 | 9/2011 | Lee et al. |
| 8,078,317 B2 | 12/2011 | Allinson et al. |
| 8,126,642 B2 | 2/2012 | Trepagnier et al. |
| 8,131,607 B2 | 3/2012 | Park et al. |
| 8,145,351 B2 | 3/2012 | Schininger et al. |
| 8,195,328 B2 | 6/2012 | Mallett et al. |
| 8,286,236 B2 | 10/2012 | Jung et al. |
| 8,412,588 B1 | 4/2013 | Bodell et al. |
| 8,418,959 B2 | 4/2013 | Kang et al. |
| 8,429,754 B2 | 4/2013 | Jung et al. |
| 8,511,606 B1 | 8/2013 | Lutke et al. |
| 8,577,538 B2 | 11/2013 | Lenser et al. |
| 8,602,349 B2 | 12/2013 | Petrov |
| 8,736,820 B2 | 5/2014 | Choe et al. |
| 8,752,166 B2 | 6/2014 | Jung et al. |
| 8,791,790 B2 | 7/2014 | Robertson et al. |
| 8,899,903 B1 | 12/2014 | Saad et al. |
| 8,948,914 B2 | 2/2015 | Zini et al. |
| 8,956,100 B2 | 2/2015 | Davi et al. |
| 8,989,053 B1 | 3/2015 | Skaaksrud et al. |
| 9,033,285 B2 | 5/2015 | Iden et al. |
| 9,051,043 B1 | 6/2015 | Peeters et al. |
| 9,079,587 B1 | 7/2015 | Rupp et al. |
| 9,139,310 B1 | 9/2015 | Wang |
| 9,163,909 B2 | 10/2015 | Chengalva |
| 9,195,959 B1 | 11/2015 | Lopez et al. |
| 9,216,587 B2 | 12/2015 | Ando et al. |
| 9,216,857 B1 | 12/2015 | Kalyan et al. |
| 9,230,236 B2 | 1/2016 | Villamar |
| 9,235,213 B2 | 1/2016 | Villamar |
| 9,244,147 B1 | 1/2016 | Soundararajan et al. |
| 9,256,852 B1 | 2/2016 | Myllymaki |
| 9,261,578 B2 | 2/2016 | Im et al. |
| 9,336,506 B2 | 5/2016 | Shucker et al. |
| 9,336,635 B2 | 5/2016 | Robertson et al. |
| 9,358,975 B1 | 6/2016 | Watts |
| 9,373,149 B2 | 6/2016 | Abhyanker |
| 9,381,916 B1 | 7/2016 | Zhu et al. |
| 9,397,518 B1 | 7/2016 | Theobald |
| 9,404,761 B2 | 8/2016 | Meuleau |
| 9,409,644 B2 | 8/2016 | Stanek et al. |
| 9,411,337 B1 | 8/2016 | Theobald et al. |
| 9,412,280 B1 | 8/2016 | Zwillinger et al. |
| 9,436,183 B2 | 9/2016 | Thakur et al. |
| 9,436,926 B2 | 9/2016 | Cousins et al. |
| 9,448,559 B2 | 9/2016 | Kojo et al. |
| 9,489,490 B1 | 11/2016 | Theobald |
| 9,510,316 B2 | 11/2016 | Skaaksrud |
| 9,535,421 B1 | 1/2017 | Canoso et al. |
| 9,545,852 B2 | 1/2017 | Streett |
| 9,561,941 B1 | 2/2017 | Watts |
| 9,568,335 B2 | 2/2017 | Thakur et al. |
| 9,582,950 B2 | 2/2017 | Shimizu et al. |
| 9,600,645 B2 | 3/2017 | Fadell et al. |
| 9,619,776 B1 | 4/2017 | Ford et al. |
| 9,623,553 B1 | 4/2017 | Theobald et al. |
| 9,623,562 B1 | 4/2017 | Watts |
| 9,650,136 B1 | 5/2017 | Haskin et al. |
| 9,652,912 B2 | 5/2017 | Fadell et al. |
| 9,656,805 B1 | 5/2017 | Evans et al. |
| 9,671,791 B1 | 6/2017 | Paczan |
| 9,682,481 B2 | 6/2017 | Lutz et al. |
| 9,697,730 B2 | 7/2017 | Thakur et al. |
| 9,718,564 B1 | 8/2017 | Beckman et al. |
| 9,720,414 B1 | 8/2017 | Theobald |
| 9,731,821 B2 | 8/2017 | Hoareau et al. |
| 9,733,646 B1 | 8/2017 | Nusser et al. |
| 9,746,852 B1 | 8/2017 | Watts et al. |
| 9,746,853 B2 | 8/2017 | Scheepjens et al. |
| 9,778,653 B1 | 10/2017 | McClintock et al. |
| 9,786,187 B1 | 10/2017 | Bar-Zeev et al. |
| 9,796,529 B1 | 10/2017 | Hoareau et al. |
| 9,828,092 B1 | 11/2017 | Navot et al. |
| 9,858,604 B2 | 1/2018 | Apsley et al. |
| 9,886,035 B1 | 2/2018 | Watts et al. |
| 9,896,204 B1 | 2/2018 | Willison |
| 9,959,771 B1 | 5/2018 | Carlson |
| 9,959,773 B2 | 5/2018 | Raptopoulos et al. |
| 9,974,612 B2 | 5/2018 | Pinter et al. |
| 10,022,753 B2 | 7/2018 | Chelian et al. |
| 10,022,867 B2 | 7/2018 | Saboo et al. |
| 10,048,697 B1 | 8/2018 | Theobald |
| 10,108,185 B1 | 10/2018 | Theobald |
| 10,249,200 B1 | 4/2019 | Grenier et al. |
| 10,514,690 B1 | 12/2019 | Siegel et al. |
| 11,798,735 B2 * | 10/2023 | Chiu ..................... H01F 27/327 |
| 11,975,628 B1 * | 5/2024 | Pathipati ................. B60L 53/66 |
| 2001/0045449 A1 | 11/2001 | Shannon |
| 2002/0016726 A1 | 2/2002 | Ross |
| 2002/0035450 A1 | 3/2002 | Thackston |
| 2002/0072979 A1 | 6/2002 | Sinha et al. |
| 2002/0087375 A1 | 7/2002 | Griffin et al. |
| 2002/0095239 A1 | 7/2002 | Wallach et al. |
| 2002/0107751 A1 | 8/2002 | Rajagopalan et al. |
| 2002/0111914 A1 | 8/2002 | Terada et al. |
| 2002/0116289 A1 | 8/2002 | Yang |
| 2002/0123930 A1 | 9/2002 | Boyd et al. |
| 2002/0156645 A1 | 10/2002 | Hansen |
| 2003/0040980 A1 | 2/2003 | Nakajima et al. |
| 2003/0072031 A1 | 4/2003 | Kuwata et al. |
| 2003/0121968 A1 | 7/2003 | Miller et al. |
| 2003/0141411 A1 | 7/2003 | Pandya et al. |
| 2004/0002898 A1 | 1/2004 | Kuhlmann et al. |
| 2004/0068416 A1 | 4/2004 | Solomon |
| 2004/0112660 A1 | 6/2004 | Johansson et al. |
| 2004/0162638 A1 | 8/2004 | Solomon |
| 2005/0068178 A1 | 3/2005 | Lee et al. |
| 2005/0093865 A1 | 5/2005 | Jia |
| 2005/0102240 A1 | 5/2005 | Misra et al. |
| 2005/0244060 A1 | 11/2005 | Nagarajan et al. |
| 2005/0285934 A1 | 12/2005 | Carter |
| 2006/0053534 A1 | 3/2006 | Mullen |
| 2006/0118162 A1 | 6/2006 | Saelzer et al. |

(56) References Cited

U.S. PATENT DOCUMENTS

| | | |
|---|---|---|
| 2006/0136237 A1 | 6/2006 | Spiegel et al. |
| 2007/0016496 A1 | 1/2007 | Bar et al. |
| 2007/0073552 A1 | 3/2007 | Hileman |
| 2007/0150375 A1 | 6/2007 | Yang |
| 2007/0170237 A1 | 7/2007 | Neff |
| 2007/0233337 A1 | 10/2007 | Plishner |
| 2007/0244763 A1 | 10/2007 | Williams et al. |
| 2007/0293978 A1 | 12/2007 | Wurman et al. |
| 2008/0027591 A1 | 1/2008 | Lenser et al. |
| 2008/0100258 A1 | 5/2008 | Ward |
| 2008/0109246 A1 | 5/2008 | Russell |
| 2008/0111816 A1 | 5/2008 | Abraham et al. |
| 2008/0150679 A1 | 6/2008 | Bloomfield |
| 2008/0154659 A1 | 6/2008 | Bettes et al. |
| 2008/0167817 A1 | 7/2008 | Hessler et al. |
| 2008/0301009 A1 | 12/2008 | Plaster et al. |
| 2009/0062974 A1 | 3/2009 | Tamamoto et al. |
| 2009/0063166 A1 | 3/2009 | Palmer |
| 2009/0079388 A1 | 3/2009 | Reddy |
| 2009/0086275 A1 | 4/2009 | Liang et al. |
| 2009/0106124 A1 | 4/2009 | Yang |
| 2009/0149985 A1 | 6/2009 | Chirnomas |
| 2009/0164379 A1 | 6/2009 | Jung et al. |
| 2009/0165127 A1 | 6/2009 | Jung et al. |
| 2009/0236470 A1 | 9/2009 | Goossen et al. |
| 2009/0254457 A1 | 10/2009 | Folsom |
| 2009/0254482 A1 | 10/2009 | Vadlamani et al. |
| 2009/0299903 A1 | 12/2009 | Hung et al. |
| 2009/0303507 A1 | 12/2009 | Abeloe |
| 2009/0314883 A1 | 12/2009 | Arlton et al. |
| 2010/0030608 A1 | 2/2010 | Kaminsky et al. |
| 2010/0031351 A1 | 2/2010 | Jung et al. |
| 2010/0088163 A1 | 4/2010 | Davidson et al. |
| 2010/0088175 A1 | 4/2010 | Lundquist |
| 2010/0169185 A1 | 7/2010 | Cottingham |
| 2010/0256852 A1 | 10/2010 | Mudalige |
| 2010/0287065 A1 | 11/2010 | Alivandi |
| 2010/0299222 A1 | 11/2010 | Hamilton et al. |
| 2011/0035149 A1 | 2/2011 | McAndrew et al. |
| 2011/0074570 A1 | 3/2011 | Feldstein et al. |
| 2011/0087350 A1 | 4/2011 | Fogel et al. |
| 2011/0112761 A1 | 5/2011 | Hurley et al. |
| 2011/0153052 A1 | 6/2011 | Pettibone et al. |
| 2011/0166707 A1 | 7/2011 | Romanov et al. |
| 2011/0246331 A1 | 10/2011 | Luther et al. |
| 2011/0264311 A1 | 10/2011 | Lee et al. |
| 2011/0282476 A1 | 11/2011 | Hegemier et al. |
| 2011/0313878 A1 | 12/2011 | Norman |
| 2012/0039694 A1 | 2/2012 | Suzanne |
| 2012/0078592 A1 | 3/2012 | Sims |
| 2012/0109419 A1 | 5/2012 | Mercado |
| 2012/0219397 A1 | 8/2012 | Baker |
| 2012/0221438 A1 | 8/2012 | Cook et al. |
| 2012/0323365 A1 | 12/2012 | Taylor et al. |
| 2013/0006739 A1 | 1/2013 | Horvitz et al. |
| 2013/0073477 A1 | 3/2013 | Grinberg |
| 2013/0081245 A1 | 4/2013 | Vavrina et al. |
| 2013/0126611 A1 | 5/2013 | Kangas et al. |
| 2013/0148123 A1 | 6/2013 | Hayashi |
| 2013/0218446 A1 | 8/2013 | Bradley et al. |
| 2013/0218799 A1 | 8/2013 | Lehmann et al. |
| 2013/0261792 A1 | 10/2013 | Gupta et al. |
| 2013/0262251 A1 | 10/2013 | Wan et al. |
| 2013/0262252 A1 | 10/2013 | Lakshman et al. |
| 2013/0262276 A1 | 10/2013 | Wan et al. |
| 2013/0262336 A1 | 10/2013 | Wan et al. |
| 2013/0264381 A1 | 10/2013 | Kim et al. |
| 2013/0324164 A1 | 12/2013 | Vulcano |
| 2014/0022055 A1 | 1/2014 | Levien et al. |
| 2014/0025230 A1 | 1/2014 | Levien et al. |
| 2014/0030444 A1 | 1/2014 | Swaminathan et al. |
| 2014/0031964 A1 | 1/2014 | Sidhu et al. |
| 2014/0032034 A1 | 1/2014 | Raptopoulos et al. |
| 2014/0040065 A1 | 2/2014 | DuBois |
| 2014/0052661 A1 | 2/2014 | Shakes et al. |
| 2014/0058959 A1 | 2/2014 | Sbjornssund et al. |
| 2014/0081445 A1 | 3/2014 | Villamar |
| 2014/0089073 A1 | 3/2014 | Jacobs et al. |
| 2014/0136282 A1 | 5/2014 | Fedele |
| 2014/0136414 A1 | 5/2014 | Abhyanker |
| 2014/0149244 A1 | 5/2014 | Abhyanker |
| 2014/0156053 A1 | 6/2014 | Mahdavi et al. |
| 2014/0180914 A1 | 6/2014 | Abhyanker |
| 2014/0200697 A1 | 7/2014 | Cheng |
| 2014/0214684 A1 | 7/2014 | Pell |
| 2014/0244433 A1 | 8/2014 | Cruz |
| 2014/0254896 A1 | 9/2014 | Zhou et al. |
| 2014/0283104 A1 | 9/2014 | Nilsson |
| 2014/0309813 A1 | 10/2014 | Ricci |
| 2014/0325218 A1 | 10/2014 | Shimizu et al. |
| 2014/0330456 A1 | 11/2014 | Morales et al. |
| 2015/0006005 A1 | 1/2015 | Yu et al. |
| 2015/0066178 A1 | 3/2015 | Stava |
| 2015/0069968 A1 | 3/2015 | Pounds |
| 2015/0102154 A1 | 4/2015 | Duncan et al. |
| 2015/0112837 A1 | 4/2015 | O'Dea |
| 2015/0112885 A1 | 4/2015 | Fadell et al. |
| 2015/0120094 A1 | 4/2015 | Kimchi et al. |
| 2015/0120602 A1 | 4/2015 | Huffman et al. |
| 2015/0127712 A1 | 5/2015 | Fadell et al. |
| 2015/0129716 A1 | 5/2015 | Yoffe |
| 2015/0153175 A1 | 6/2015 | Skaaksrud |
| 2015/0154545 A1 | 6/2015 | Skaaksrud et al. |
| 2015/0158599 A1 | 6/2015 | Sisko |
| 2015/0175276 A1 | 6/2015 | Koster |
| 2015/0183528 A1 | 7/2015 | Walsh et al. |
| 2015/0185034 A1 | 7/2015 | Abhyanker |
| 2015/0202770 A1 | 7/2015 | Patron et al. |
| 2015/0227882 A1 | 8/2015 | Bhatt |
| 2015/0246727 A1 | 9/2015 | Masticola et al. |
| 2015/0253777 A1 | 9/2015 | Binney et al. |
| 2015/0254611 A1 | 9/2015 | Perez |
| 2015/0259078 A1 | 9/2015 | Filipovic et al. |
| 2015/0317597 A1 | 11/2015 | Shucker et al. |
| 2015/0332206 A1 | 11/2015 | Trew et al. |
| 2015/0367850 A1 | 12/2015 | Clarke et al. |
| 2015/0370251 A1 | 12/2015 | Siegel et al. |
| 2016/0009413 A1 | 1/2016 | Lee et al. |
| 2016/0019495 A1 | 1/2016 | Kolchin |
| 2016/0033966 A1 | 2/2016 | Farris et al. |
| 2016/0068264 A1 | 3/2016 | Ganesh et al. |
| 2016/0068267 A1 | 3/2016 | Liu et al. |
| 2016/0104099 A1 | 4/2016 | Villamar |
| 2016/0104113 A1 | 4/2016 | Gorlin |
| 2016/0107750 A1 | 4/2016 | Yates |
| 2016/0114488 A1 | 4/2016 | Medina et al. |
| 2016/0117931 A1 | 4/2016 | Chan et al. |
| 2016/0129592 A1 | 5/2016 | Saboo et al. |
| 2016/0132059 A1 | 5/2016 | Mason et al. |
| 2016/0144734 A1 | 5/2016 | Wang et al. |
| 2016/0144982 A1 | 5/2016 | Sugumaran |
| 2016/0196755 A1 | 7/2016 | Navot et al. |
| 2016/0196756 A1 | 7/2016 | Prakash et al. |
| 2016/0200438 A1 | 7/2016 | Bokeno et al. |
| 2016/0207627 A1 | 7/2016 | Hoareau et al. |
| 2016/0214717 A1 | 7/2016 | Silva |
| 2016/0235236 A1 | 8/2016 | Byers et al. |
| 2016/0236778 A1 | 8/2016 | Takayama et al. |
| 2016/0239789 A1 | 8/2016 | Hanks |
| 2016/0239803 A1 | 8/2016 | Borley et al. |
| 2016/0257401 A1 | 9/2016 | Buchmueller et al. |
| 2016/0258775 A1 | 9/2016 | Santilli et al. |
| 2016/0266578 A1 | 9/2016 | Douglas et al. |
| 2016/0282126 A1 | 9/2016 | Watts et al. |
| 2016/0299233 A1 | 10/2016 | Levien et al. |
| 2016/0334229 A1 | 11/2016 | Ross et al. |
| 2016/0364660 A1 | 12/2016 | Brown |
| 2016/0364679 A1 | 12/2016 | Cao |
| 2016/0364823 A1 | 12/2016 | Cao |
| 2016/0364989 A1 | 12/2016 | Speasl et al. |
| 2017/0011333 A1 | 1/2017 | Greiner et al. |
| 2017/0011340 A1 | 1/2017 | Gabbai |
| 2017/0032315 A1 | 2/2017 | Gupta et al. |
| 2017/0087999 A1 | 3/2017 | Miller et al. |

(56) References Cited

U.S. PATENT DOCUMENTS

| | | | |
|---|---|---|---|
| 2017/0096222 A1 | 4/2017 | Spinelli et al. | |
| 2017/0098378 A1 | 4/2017 | Soundararajan et al. | |
| 2017/0100837 A1 | 4/2017 | Zevenbergen et al. | |
| 2017/0101017 A1 | 4/2017 | Streett | |
| 2017/0113352 A1 | 4/2017 | Lutz et al. | |
| 2017/0147975 A1 | 5/2017 | Natarajan et al. | |
| 2017/0154347 A1 | 6/2017 | Bateman | |
| 2017/0164319 A1 | 6/2017 | Skaaksrud et al. | |
| 2017/0167881 A1 | 6/2017 | Rander et al. | |
| 2017/0193442 A1 | 7/2017 | Ekkel et al. | |
| 2017/0255896 A1 | 9/2017 | Dyke | |
| 2017/0286905 A1 | 10/2017 | Richardson et al. | |
| 2017/0300855 A1 | 10/2017 | Lund et al. | |
| 2017/0308098 A1 | 10/2017 | Yu et al. | |
| 2017/0316379 A1 | 11/2017 | Lepek et al. | |
| 2017/0345245 A1 | 11/2017 | Torresani et al. | |
| 2017/0372256 A1 | 12/2017 | Kantor et al. | |
| 2018/0024554 A1 | 1/2018 | Brady et al. | |
| 2018/0088586 A1 | 3/2018 | Hance et al. | |
| 2018/0127211 A1 | 5/2018 | Jarvis et al. | |
| 2018/0137454 A1 | 5/2018 | Kulkarni et al. | |
| 2018/0203464 A1 | 7/2018 | Yu et al. | |
| 2019/0023139 A1* | 1/2019 | Wechsler | B60L 53/39 |
| 2019/0220819 A1 | 7/2019 | Banvait et al. | |
| 2020/0174494 A1 | 6/2020 | Lessels | |
| 2020/0249698 A1 | 8/2020 | Lu et al. | |
| 2022/0084340 A1* | 3/2022 | Hall | B60P 1/003 |
| 2023/0081083 A1* | 3/2023 | Fisher | H02J 7/0063 |
| | | | 320/109 |

FOREIGN PATENT DOCUMENTS

| | | | |
|---|---|---|---|
| EP | 2682837 A1 | 1/2014 | |
| FR | 2692064 A1 | 12/1993 | |
| JP | 2004126800 A | 4/2004 | |
| JP | 2011211025 A | 10/2011 | |
| WO | 0138945 A1 | 5/2001 | |
| WO | 2013148123 A1 | 10/2013 | |
| WO | 2017064202 A1 | 4/2017 | |
| WO | 2017196759 A1 | 11/2017 | |
| WO | 2018035578 A1 | 3/2018 | |

OTHER PUBLICATIONS

DHL Trend Research, "Self-Driving Vehicles in Logistics," Dec. 2014, Markus Kuckelhaus et al. (downloaded from http://www.dhl.com/content/dam/downloads/g0/about_us/logistics_insights/dhl_self_driving_vehicles.pdf with an archived Web version available on https://web.archive.org/web/20151018154844/ http://www.dhl.com/content/dam/downloads/g0/about_us/logistics_insights/dhl_self_driving_vehicles.pdf), 39 pages.

DHL Trend Research, "Unmanned Aerial Vehicles in Logistics: A DHL perspective on implications and use cases for the logistics industry," 2014, Markus Kuckelhaus et al., URL: http://www.dhl.com/content/dam/downloads/g0/about_us/logistics_insights/dhl_trend_report_uav.pdf with a Web Archive version available at: https://web.archive.org/web/20150923080141/http://www.dhl.com/en/about_us/logistics_insights/dhl_trend_research/uav.html, 24 pages.

Hawas et al., "Infrastructureless Inter-Vehicular Real-Time Route Guidance," 2008, IEEE, p. 1213-1219 (Year: 2008).

Kais, Mikael et al., "An Intelligent architecture for automated transportation in our cities", 2001 European Control Conference (ECC), Porto, Portugal, Sep. 4-7, 2001, pp. 277-282 (Year: 2001).

Kladis et al., "Event-Based Energy Optimum Route Planning in the Context of Unmanned Aerial Vehicles for Multi-Objective Exploration Missions," 2009, IEEE, p. 1281-1286 (Year: 2009).

Marcus Wohlsen, "The Next Big Thing You Missed: Amazon's Delivery Drones Could Work—They Just Need Trucks," Wired: Business, Jun. 10, 2014, URL: https://www.wired.com/2014/06/the-next-big-thing-you-missed-delivery-drones-launched-from-trucks-are-the-future-of-shipping/, 4 pages.

Mike Murphy, "Google wants to deliver packages from self-driving trucks," published Feb. 9, 2016, URL: https://qz.com/613277/google-wants-to-deliver-packages-from-self-driving-trucks/, 4 pages.

Navaravong et al., "Formation Reconfiguration for Mobile Robots with Network Connectivity Constraints," 2012, IEEE, p. 18-24 (Year: 2012).

Parent, Michel et al., "Intelligent Transportation in Cities with CTS", The IEEE 5th International Conference on Intelligent Transportation Systems, Sep. 3-6, 2002, Singapore, pp. 826-830 (Year: 2002).

Sandoval, "Google patents secure rolling box to receive packages from drones," Geekwire.com, Jan. 27, 2016, URL: http://www.geekwire.com/2016/google-pondering-drone-delivery-even-about-boxes-it-flies-to-front-doors/, 11 pages.

Schuster, Martin J., et al.: "Multi-Robot 6D Graph SLAM Connecting Decoupled Local Reference Filters", 2015 IEEE/RSJ International Conference on Intelligent Robots and Systems (IROS), IEEE, Sep. 28, 2015 (Sep. 28, 2015), pp. 5093-5100, XP032832362, DOI: 10.1109/IROS.2015.7354094[retrieved on Mar. 24, 2021], URL: https://core.ac.uk/download/pdf/31021582.pdf.

Smith, Randall C., and Peter Cheeseman, "On the Representation and Estimation of Spatial Uncertainty," The Int'l Journal of Robotics Research, vol. 5, No. 4 (Winter 1986), Copyright 1986 Massachusetts Institute of Technology, 14 pages.

URL: https://web.archive.org/web/20160804001046/https://www.starship.xyz/, download date: Aug. 4, 2016, 21 pages.

* cited by examiner

MODULAR FACILITIES AND CHARGING CONSOLES FOR AUTONOMOUS GROUND VEHICLES

BACKGROUND

Autonomous ground vehicles, which are sometimes called unmanned ground vehicles or autonomous mobile robots, are being increasingly utilized in the performance of a number of commercial applications, personal tasks, and other functions. For example, autonomous ground vehicles have been utilized to complete deliveries of food products or other items to locations or personnel indoors or outdoors, to survey ground conditions, to monitor traffic, or to identify situations requiring alternative or additional assistance from humans or other machines.

As the use of autonomous ground vehicles grows in popularity, and as the numbers of applications in which such vehicles may be utilized continues to increase, facilities for housing and servicing such vehicles are becoming more essential over time. For example, because many autonomous ground vehicles operate with electrically powered motors and onboard computer systems or other components, facilities for powering such vehicles, or for exchanging data with such vehicles, is critically important to ensure their value and utility. After all, if facilities for charging an autonomous ground vehicle are limited in number or provided in only certain locations, the value and usefulness of the vehicle are diminished, as the vehicle must expend time and energy traveling between the locations of such facilities and locations at which the use of the autonomous ground vehicle is desired.

DETAILED DESCRIPTION

As is set forth in greater detail below, the present disclosure is directed to modular facilities and charging consoles for autonomous ground vehicles. More specifically, some implementations of the systems and methods disclosed herein are directed to facilities having enclosures or spaces for accommodating one or more ground vehicles, such as autonomous ground vehicles. The facilities are defined by frames, panels, doors or other structural components or features, and accessible to one or more ground vehicles by ramps or other components or features.

Some implementations of the systems and methods disclosed herein further include charging consoles or other components for transferring electrical power to ground vehicles, or exchanging information or data with ground vehicles. The charging consoles or other components may be releasably or interchangeably installed on or within one or more facilities of the present disclosure, or independent of any such facilities, and may be configured to receive electrical power for powering ground vehicles from any power source, or to transmit or receive information or data of any type or form to or from the ground vehicles.

In some implementations, facilities may be modular in nature, and may be configured to accommodate multiple ground vehicles. For example, in some implementations, a facility may have an enclosure or space that is formed from multiple frames, and may include panels, doors or other structural components or features for enabling multiple ground vehicles to access the enclosure or space. The panels, doors or other structural components or features may be interchangeable or interoperable in nature, and may be substituted for one another or repositioned as necessary. Where a facility is configured to accommodate multiple ground vehicles, the facility may include one charging console for each of such vehicles, and the charging consoles may be configured to receive electrical power for powering ground vehicles from any power source, or from one or more other charging consoles.

Referring to FIGS. 1A through 1F, views of aspects of one system including a facility and a charging console for autonomous ground vehicles in accordance with implementations of the present disclosure are shown.

Figure 1A:
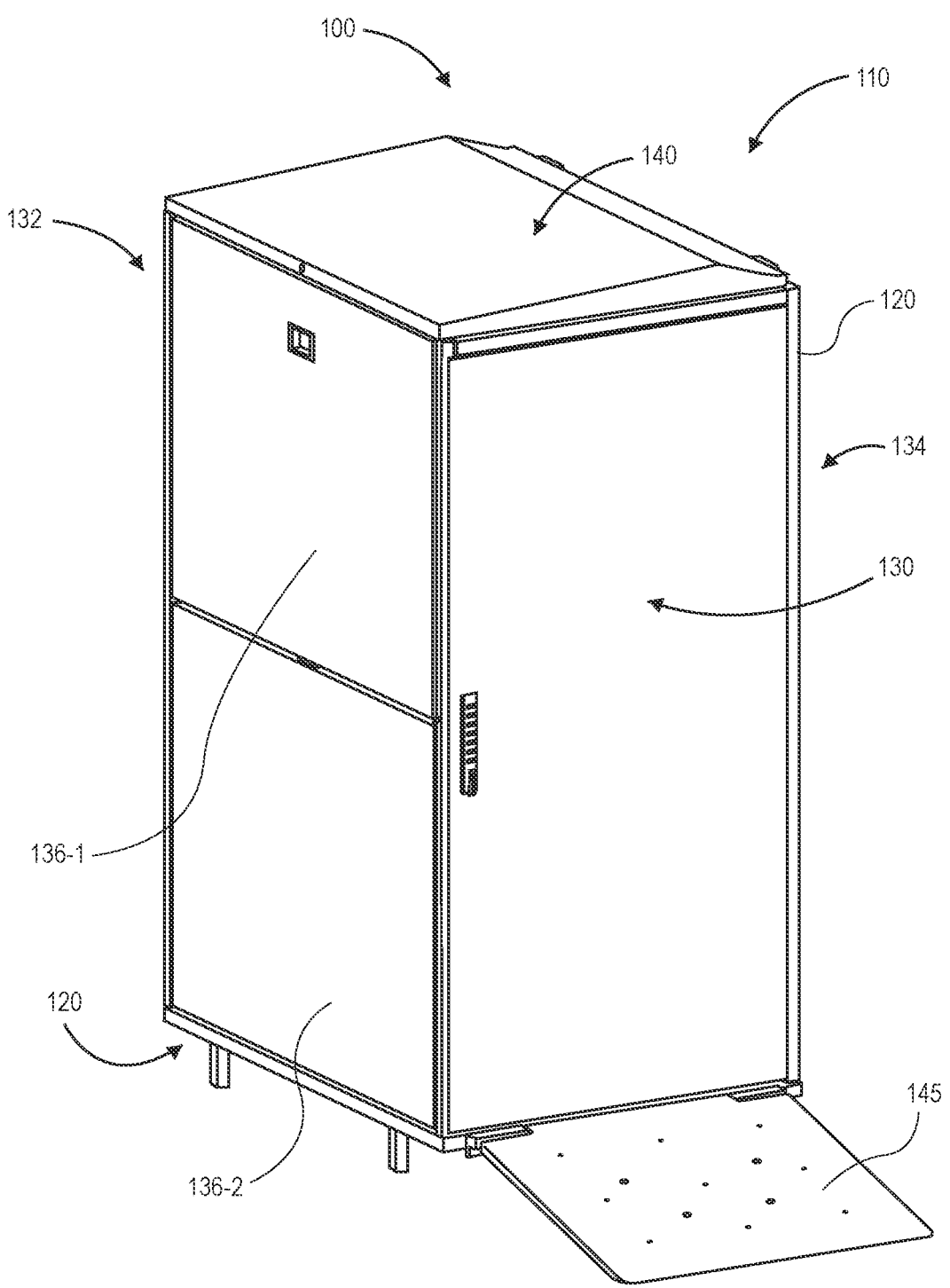
FIGS. 1A through 1F are views of aspects of one system including a facility and a charging console for autonomous ground vehicles in accordance with implementations of the present disclosure.
Figure 1B:
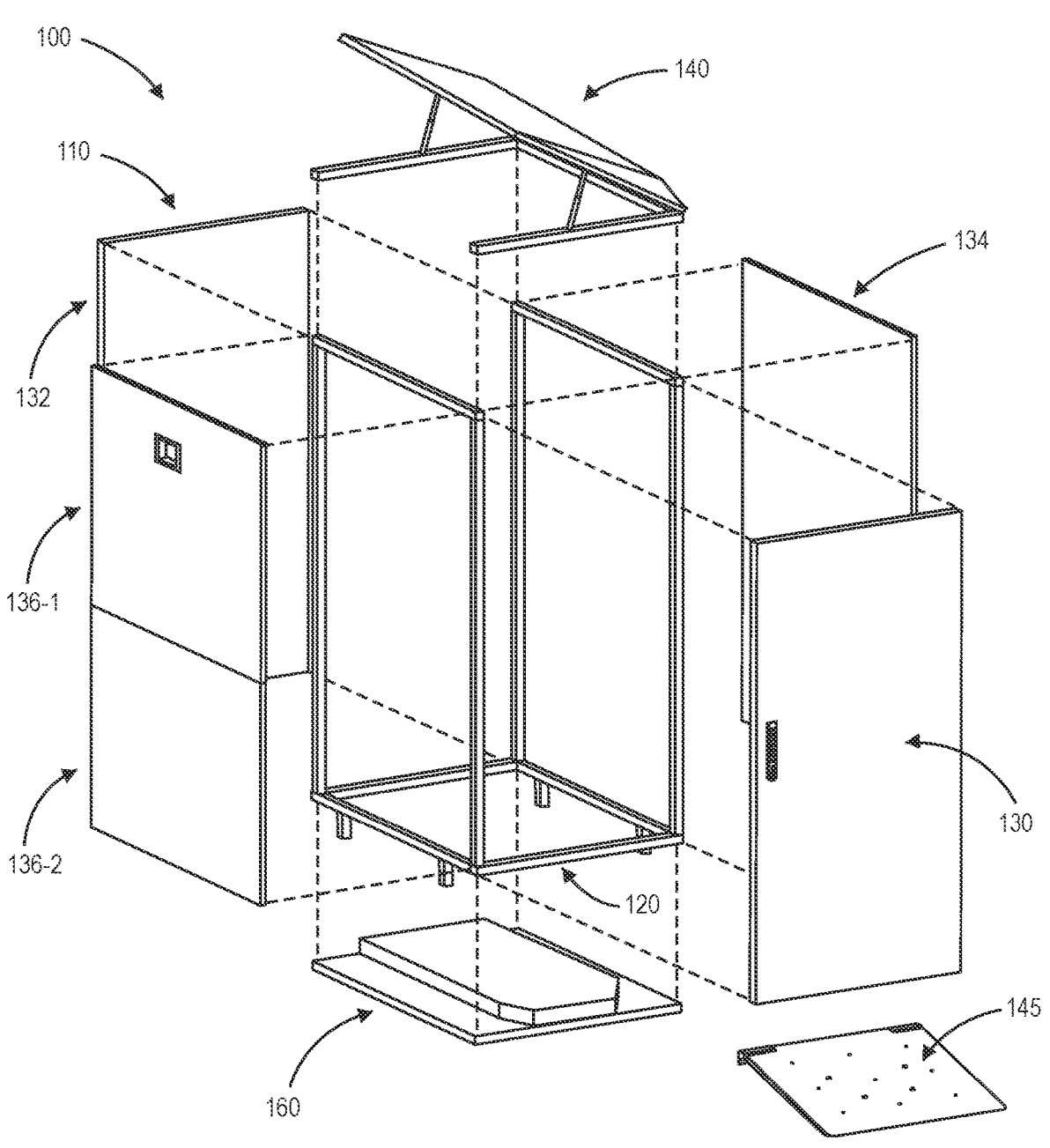

As is shown in FIGS. 1A and 1B, a facility 100 includes a space (or an enclosure) 110 for accommodating an autonomous ground vehicle therein. The facility 100 is formed from, and the space 110 is defined by, a frame 120, a front door 130, a rear panel 132, a side panel 134, and a side door 136-1 provided above a side panel 136-2. The facility 100 further includes a top lid (or a top cover) 140 and a ramp 145 adjacent the front door 130. Within the facility, a charging console 160 is provided.

The frame 120 is formed by a polygonal base having a plurality of vertical posts mounted at proximal ends to corners or intersections of the polygonal base. The frame 120 further includes a pair of horizontal supports mounted at distal ends of the vertical posts to stiffen the frame 120, and to provide structural support for components atop the frame 120, such as the top lid 140. Additionally, the frame 120 further includes a plurality of adjustable feet that may, in some implementations, be adjusted individually or collectively to ensure that the facility 100 or surfaces within the space 110, or an autonomous ground vehicle accommodated therein, are aligned substantially horizontally or at any desired planar angle.

Each component or feature of the frame 120, e.g., portions of the base, the vertical posts or horizontal supports, or the adjustable feet, may be a solid or substantially hollow section formed from any materials (e.g., metals such as steel or aluminum, plastics, composites or others) and having any shape. The frame 120 may be formed by joining such components or features by bolting, welding or in any manner, either directly to one another or by brackets or other objects for joining two or more of such components or features.

The front door 130 may be any hinged or otherwise panel-like feature that may be movably mounted to the frame 120, e.g., to or between the vertical posts, and operated to enable access to the space 110 by an autonomous ground vehicle or a human, or any other object or entity. The front door 130 may be secured in a closed position (e.g., locked) by one or more mechanical, electrical or magnetic systems, such as a lock, an interlock, or another access control system, to provide or define a wall, a boundary or another barrier of the space 110. The front door 130 may also be enabled to be placed in an open position, or in any intervening position between the open position and the closed position, where the lock, the interlock or the other access control system releases or enables at least a portion of the front door 130 to be rotated, pivoted or otherwise moved about a vertical axis from the frame 120. Alternatively, in some implementations, the front door 130 may be a sectional door, a roll-up door, a sliding door, a tilt-up door, a canopy door, a retractable door, or any other type or form of door that may be operated to enable access to the space 110.

The front door 130 may be formed from one or more layers of steel, aluminum or other metals, or from any other materials, e.g., plastics (or composites). In some implementations, the front door 130 may be formed from multiple sections that may be individually or collectively operated to enable access to the space 110.

In some implementations, the facility 100 may include one or more gaskets or other compressive surfaces provided along a perimeter or contact points between the front door 130 and the frame 120. Such gaskets or surfaces may be compressed when the front door 130 is in the closed position and released from pressure when the front door 130 is in the open position, or between the open position and the closed position. Additionally, in some implementations, the front door 130 may include any number of pistons, springs or other components for facilitating the opening or closure of the front door 130.

The back panel 132 may be any panel or structure that may be fixedly mounted to the frame 120, e.g., to or between the vertical posts. As is shown in FIG. 1B, the back panel 132 is provided on an opposite face of the fixture 110 from the front door 130.

The back panel 132 may provide or define a wall, a boundary or another barrier of the space 110, but need not enable access to the space 110. In some implementations, the back panel 132 may be formed from the same materials from which the front door 130 is formed, e.g., one or more layers of steel, aluminum, plastics, or others, or from different materials. In some implementations, the back panel 132 may be substantially identical to the front panel 130 and fixedly mounted to the frame 120 without any hinges or other components. Alternatively, the back panel 132 may be or include a door, substantially identical to the front door 130 and provided on an opposite face of the fixture 110 from the front door 130.

The side panel 134 may be any panel or structure that may be fixedly mounted to the frame 120, e.g., to or between the vertical posts. As is shown in FIG. 1B, the side panel 134 is provided on a face of the fixture 110 adjacent to faces of the fixture 110 including the front door 130 and the back panel 132.

Like the back panel 132, the side panel 134 may provide or define a wall, a boundary or another barrier of the space 110, but need not enable access to the space 110. In some implementations, the back panel 132 may be formed from the same materials from which the front door 130 or the back panel 132 are formed, e.g., one or more layers of steel, aluminum, plastics, or others, or from different materials. In some implementations, the side panel 134 may be substantially identical to the back panel 132 and fixedly mounted to the frame 120 in the same manner. Alternatively, the side panel 134 may also be or include a door, substantially identical to the front door 130 and provided on a face of the fixture 110 adjacent to the front door 130.

As is shown in FIG. 1B, the side door 136-1 and the side panel 136-2 are provided on an opposite face of the fixture 110 from the side panel 134.

The side door 136-1 and the side panel 136-2 may be any pairs of panels or structures that may be mounted to the frame 120, e.g., to or between the vertical posts. The side door 136-1 may be movably mounted to the frame 120, in a manner similar to that of the front door 130, e.g., rotated, pivoted or otherwise moved about a vertical axis from the frame 120. The side door 136-1 may be secured in a closed position by a lock, an interlock, or another access control system to provide or define a wall, a boundary or another barrier of the space 110. The side door 136-1 may also be enabled to be placed in an open position, or in any intervening position between the open position and the closed position, by the lock, the interlock, or the other access control system. The side panel 136-2 may be fixedly mounted to the frame 120 in a manner similar to that of the back panel 132 or the side panel 134 and may provide or define a wall, a boundary or another barrier of the space 110, but need not enable access to the space 110.

In some implementations, the side door 136-1 and the side panel 136-2 may be formed from the same materials from which the front door 130, the back panel 132 or the side panel 134 are formed, e.g., one or more layers of steel, aluminum, plastics, or others, or from different materials. In some implementations, the side door 136-1 and the side panel 136-2 may be replaced by a single, substantially fixed panel that is identical or similar to the back panel 132 or the side panel 134. Alternatively, in some implementations, the side door 136-1 and the side panel 136-2 may be replaced by a single, movable door that is identical or similar to the front door 130.

The top lid 140 provides a cover or layer of protection vertically above or over the space 110. The top lid 140 may be a single object or component, or formed from two or more objects or components, that may be movably mounted to the frame 120, e.g., to or above the vertical posts or horizontal supports, and operated to enable access to the space 110 by a human, or any other object or entity. The top lid 140 may be secured in a closed position (e.g., locked) by one or more mechanical, electrical or magnetic systems, such as a lock, an interlock, or another access control system, to provide or define a wall, a boundary or another barrier of the space 110. The top lid 140 may also be enabled to be placed in an open position, or in any intervening position between the open position and the closed position, where the lock, the interlock or the other access control system releases or enables at least a portion of the top lid 140 to be rotated, pivoted or otherwise moved about a horizontal axis from above the frame 120. The top lid 140 may be formed from one or more layers of steel, aluminum or other metals, or from any other materials, e.g., plastics (or composites). Although the horizontal axis is shown as being aligned along one side of the frame 120, enabling the top lid 140 to open or close laterally, e.g., in a side-to-side manner, the top lid 140 may be mounted to the frame 120 to permit the top lid 140 to open or close with respect to any side or face of the facility 100, e.g., front-to-back or back-to-front, or in any other manner in accordance with implementations of the present disclosure.

With one or more of the front door 130, the back panel 132, the side panel 134, the side door 136-1 or the side panel 136-2 mounted to the frame 120, the facility 100 may protect the charging console 160 and any autonomous ground vehicles therein from the elements, e.g., rain, sleet, snow or other precipitation, as well as from any interference or contact from unauthorized personnel.

Additionally, as is discussed above with respect to the front door 130, in some implementations, the facility 100 may include one or more gaskets or other compressive surfaces provided along a perimeter or contact points between the top lid 140 and the frame 120. Such gaskets or surfaces may be compressed when the top lid 140 is in the closed position and released from pressure when the top lid 140 is in the open position, or between the open position and the closed position. Additionally, in some implementations, the top lid 140 may include any number of pistons, springs or other components for facilitating the opening or closure of the top lid 140.

In some implementations, the frame 120 or any of the front door 130, the back panel 132, the side panel 134, the side door 136-1 and the side panel 136-2 or the top lid 140 may be formed from two or more types or forms of materials, e.g., metals and plastics. Moreover, such materials may be selected on any basis. For example, in some implementations, one or more portions of the frame 120 may be formed from steel or another metal alloy, e.g., for enhanced strength or rigidity, while the front door 130, the back panel 132, the side panel 134, the side door 136-1 and the side panel 136-2 or the top lid 140 may be formed from plastics or composites, e.g., for reduced weight or cost, or to improve transmissibility of wireless communications therethrough.

The ramp 145 may be any flat or curved transition surface provided to enable an autonomous ground vehicle to access the space 110, e.g., by providing rolling access to the space 110. The ramp 145 may have an edge or other aspect provided at one level or altitude on a ground surface outside of the facility 100, and another edge or other aspect provided at another level or altitude corresponding to one or more of the frame 120 or the charging console 160 within the facility 100. The ramp 145 thereby enables an autonomous ground vehicle or any other wheeled system to roll up from the level or altitude of the ground surface into the level or altitude corresponding to the frame 120 or the charging console 160 within the facility 100. The ramp 145 may be formed from any suitable materials, e.g., one or more layers of steel, aluminum or other metals, plastics, composites, wood or others. In some implementations, however, the ramp 145 need not be utilized. In some implementations, the facility 100 may include another transition surface, such as a set of stairs, for providing rolling access to the space 110.

Dimensions, shapes, materials or other attributes of components of the facility 100, e.g., the frame 120, the front door 130, the back panel 132, the side panel 134, the side door 136-1, the side panel 136-2, the top lid 140 or the ramp 145 may be selected on any basis. In some implementations, a cross-sectional area of the space 110 or the frame 120, or an internal length and width of the space 110 or the frame 120, may be selected based on a two-dimensional footprint or area of an autonomous ground vehicle to be accommodated within the space 110. In some other implementations, an internal height of the space 110 or the frame 120 may be selected based on a height of the autonomous ground vehicle to be accommodated within the space 110, as well as any other operational constraints or considerations. For example, a height of the side panel 136-2 may be selected based on a height of an autonomous ground vehicle to be accommodated within the space 110, and a height of the side door 136-1 may be selected to enable a human to reach into the space 110 via the side door 136-1. An internal height of the space 110 or the frame 120 may be determined based on the combined heights of the side panel 136-2 and the side door 136-1, or a height of the front door 130, each of which corresponds to a height of the vertical posts.

As is also shown in FIG. 1B, a height of the side door 136-1 and a height of the side panel 136-2 are each approximately one-half of a height of the front door 130, or approximately one half of a height of each of the vertical posts of the frame 120. Alternatively, a height of the side door 136-1 may be any other ratio or relation to a height of the front door 130, a height of the side panel 136-2 or a height of the frame 120.

Moreover, where the frame 120 is symmetrical in nature, and where the front door 130, the back panel 132, the side panel 134, and the combined side door 136-1 and side panel 136-2 have common widths and heights, the various panels or doors may be interchangeable in nature, and installed or mounted within the frame 120 in any locations. Thus, the terms "front," "back" and "side" may but need not refer to relative locations of the various panels or doors within the frame 120, as the front door 130 and the back panel 132, or the side panel 134 and the combined side door 136-1 and side panel 136-2, are both interchangeable and interoperable and may be installed or mounted within the frame 120 in any location or number. For example, referring again to FIGS. 1A and 1B, the facility 100 may be formed with multiples of the front door 130, or multiples of the combined side door 136-1 and side panel 136-2, e.g., each mounted or installed between a pair of the posts.

The charging console 160 is a component including features for providing electrical power to an autonomous ground vehicle within the space 110, and for enabling the transfer of data (e.g., transmission and receipt) with the autonomous ground vehicle within the space 110. In some implementations, the charging console 160 may be mounted to the frame 120 and may include one or more features for electromagnetic inductive (e.g., wireless) charging or direct conductive (e.g., wired) charging of autonomous ground vehicles within the space 110. For example, in some implementations, the charging console 160 may include a power conversion unit, such as a battery charger, that is designed or graded for generating any amount of power (e.g., approximately five hundred to one thousand watts, or any other number of watts) at any output alternating current (or "AC") or direct current (or "DC") voltage (e.g., thirty to sixty volts, or any other voltage level) or current (e.g., twenty to forty amps, or any other current level). Electrical power may be transferred by the charging console 160 to an autonomous ground vehicle via induction, conduction or in any other manner. In some implementations, the charging console 160 may be configured to receive AC electrical power, e.g., in a single phase, or in three phases, and at a voltage level of approximately two hundred to two hundred forty volts (200-240 V).

Additionally, the charging console 160 may further include one or more transceivers for engaging in wired or wireless communication with an autonomous ground vehicle within the space 110, or with any external computer devices over one or more networks. For example, the charging console 160 may communicate with an autonomous ground vehicle via wired technologies such as Universal Serial Bus (or "USB") or fiber optic cable, or standard wireless protocols such as Bluetooth® or any Wireless Fidelity (or "Wi-Fi") protocol. The charging console 160 may further perform any necessary protocol, timing or other data transformations in order to convert data signals from a first format suitable for use by one component into a second format suitable for use by another component. The charging console 160 may also include any number of processors, sensors (e.g., visual cameras or depth cameras), feedback devices, chips, electrodes, clocks, boards, timers or other relevant components.

Figure 1C:
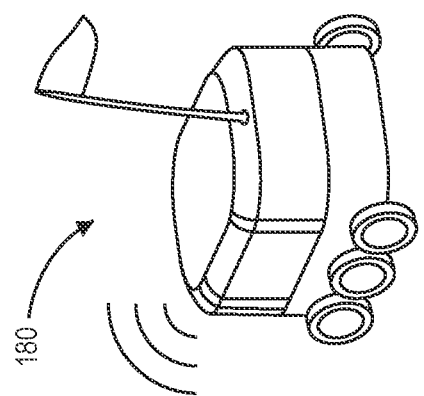
Figure 1C:
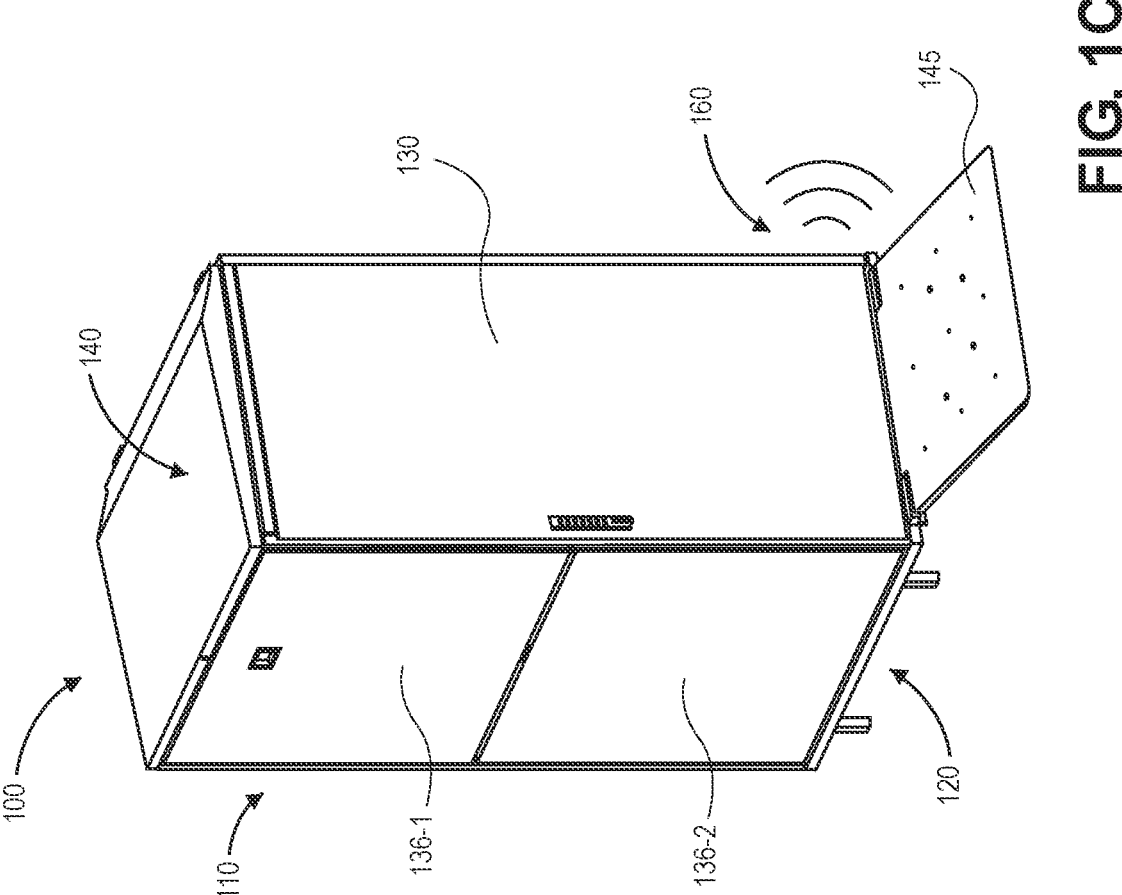

As is discussed above, a facility having an enclosure or space and a charging console therein may be configured to receive an autonomous ground vehicle therein. As is shown in FIG. 1C, an autonomous ground vehicle 180 approaches the facility 100 and engages in an authentication process, e.g., by transmitting one or more keys or other information or data to the charging console 160, or to any components within the facility 100. For example, the autonomous ground vehicle 180 may be configured to transmit signals including the information or data at any frequency. In some implementations, the autonomous ground vehicle 180 may approach to within a very short range of the facility 100, e.g., approximately one-and-one-half inches for NFC communications, and transmit the code to a wireless system associated with the charging console 160 or the front door 130 (e.g., a high frequency or RFID signal typically within a range of approximately 13.56 megahertz, or MHz). Alternatively, in some implementations, the autonomous ground vehicle 180 may transmit a Bluetooth® signal to a wireless system associated with the charging console 160 or the front door 130 from greater distances (e.g., at a frequency of approximately 2.4 gigahertz, or GHz). In still other implementations, the autonomous ground vehicle 180 may transmit a signal according to any Wi-Fi protocol.

Figure 1D:
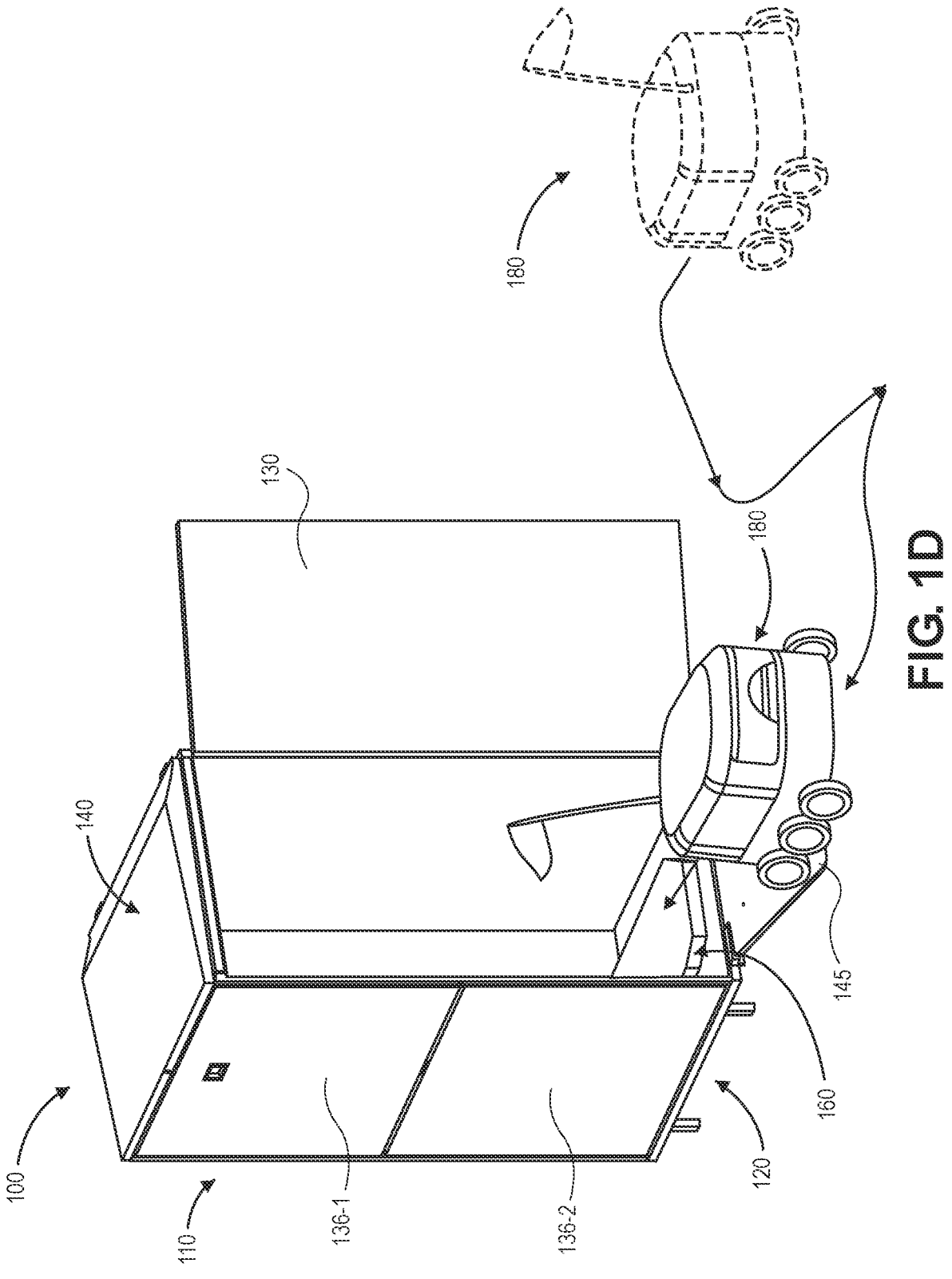

As is shown in FIG. 1D, upon authenticating the autonomous ground vehicle 180, or otherwise determining that the autonomous ground vehicle 180 is permitted to enter the facility 100, the front door 130 may open, and the autonomous ground vehicle 180 may drive therein, e.g., by rolling up the ramp 145 and entering the space 110. In some implementations, the front door 130 may be operated by one or more motors, which may have one or more chain-driven, belt-driven, screw-driven or other actuators or operators for causing the front door 130 to travel between the closed position and an open position. Alternatively, or additionally, in some implementations, the front door 130 may be manually operated, e.g., by one or more humans, or remotely operated or actuated, e.g., in response to one or more signals received from a system other than the autonomous ground vehicle 180.

Figure 1E:
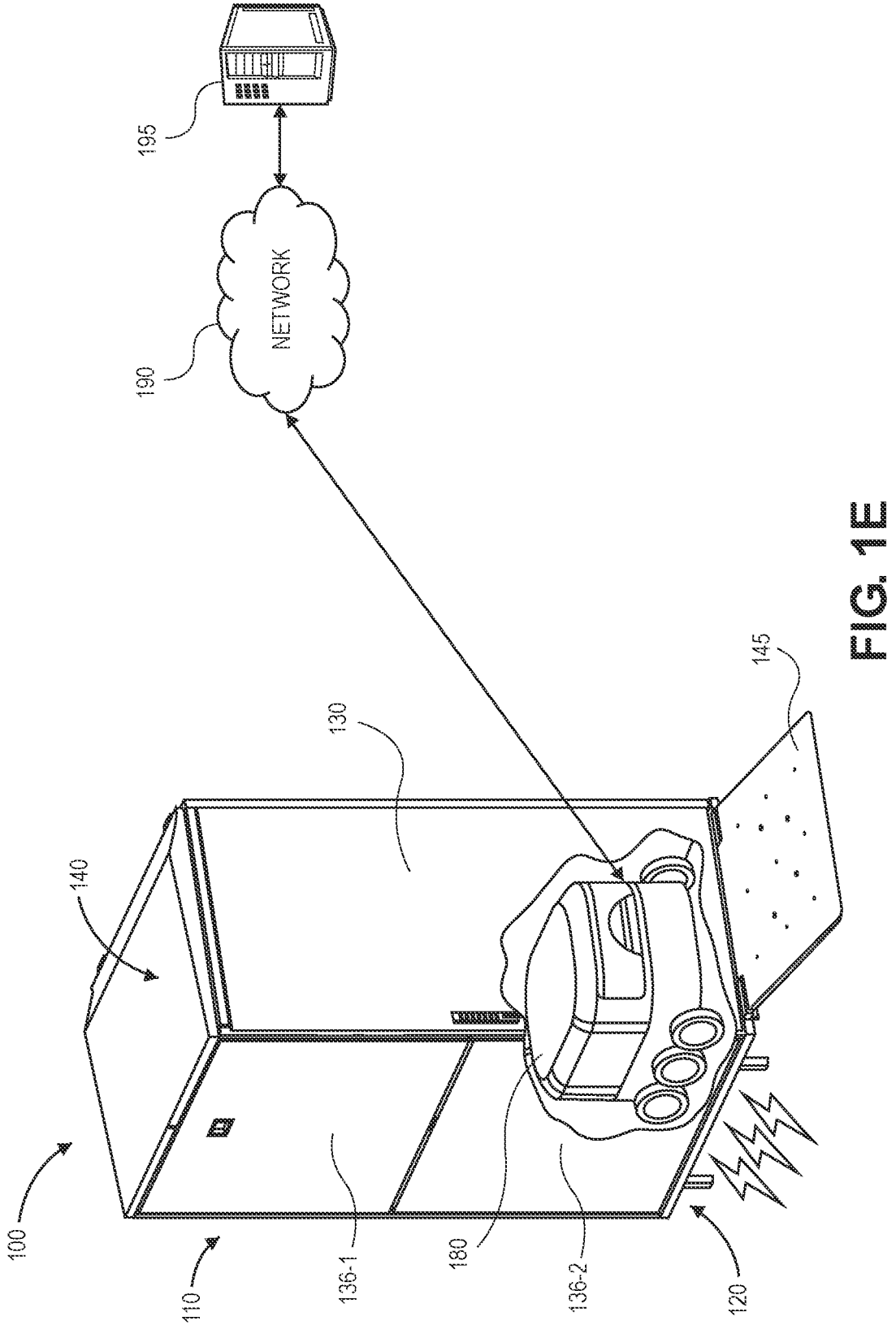

As is shown in FIG. 1E, once the autonomous ground vehicle 180 has entered the facility 100, the autonomous ground vehicle 180 may begin to receive electrical power from the charging console 160, or engage in unidirectional or bidirectional communication with one or more external computer systems 195 or devices over one or more networks 190, which may include the Internet in whole or in part. Any type or form of information or data may be transmitted by the autonomous ground vehicle 180 to the external computer systems 195, or received by the autonomous ground vehicle 180 from the external computer systems 195, including but not limited to information or data regarding missions or tasks previously performed by the autonomous ground vehicle 180, or missions or tasks to be performed by the autonomous ground vehicle 180. Such missions or tasks may include, but need not be limited to, deliveries of items by the autonomous ground vehicle 180 to one or more locations.

Figure 1F:
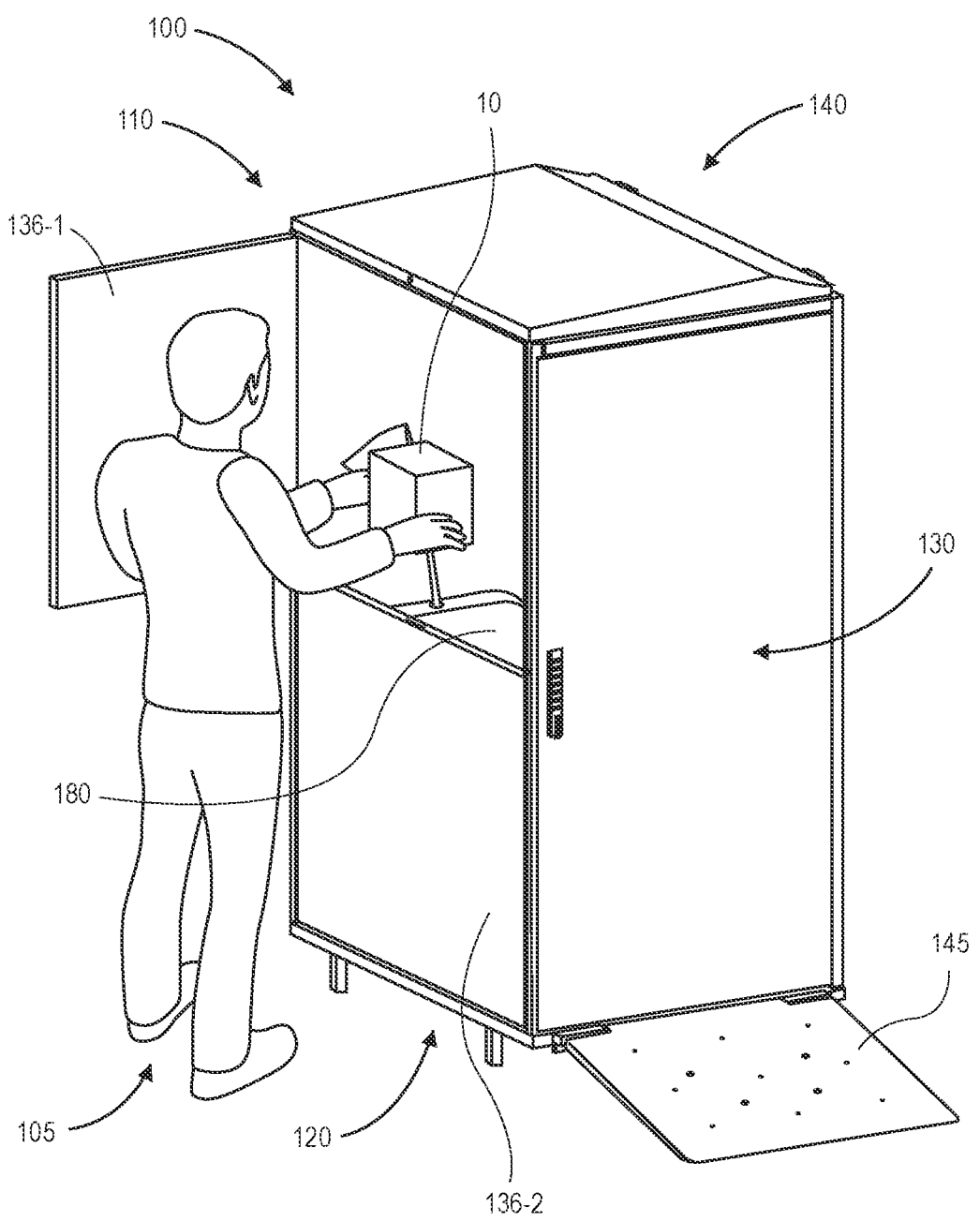

Additionally, as is shown in FIG. 1F, with the autonomous ground vehicle 180 within the space 110, a human 105 or any number of other humans or machines may access the autonomous ground vehicle 180 within the space 110 for any reason, e.g., to inspect the autonomous ground vehicle 180, to perform maintenance on the autonomous ground vehicle 180, or to deposit items into or remove items from the autonomous ground vehicle 180. For example, as is shown in FIG. 1F, the human 105 may manually or automatically operate the side door 136-1 to access the space 110 and the autonomous ground vehicle 180 therein, e.g., to deposit an item 10 within a storage compartment of the autonomous ground vehicle 180.

Subsequently, after a power level of the autonomous ground vehicle 180 is sufficiently high, after the autonomous ground vehicle 180 has transmitted or received all relevant information or data, or at any other suitable time, the autonomous ground vehicle 180 may depart from the space 110 to perform any number of missions or tasks, e.g., deliveries of one or more items, and may return to the facility 100 or to any similar facility after completing such missions or tasks, or for any other reason and on any other occasion. For example, in some implementations, the front door 130 may be opened in a reciprocal manner to that discussed above with regard to FIG. 1C, e.g., in response to one or more signals received from the autonomous ground vehicle 180 or another source, or by manual operation, such as by the human 105.

Figure 2:
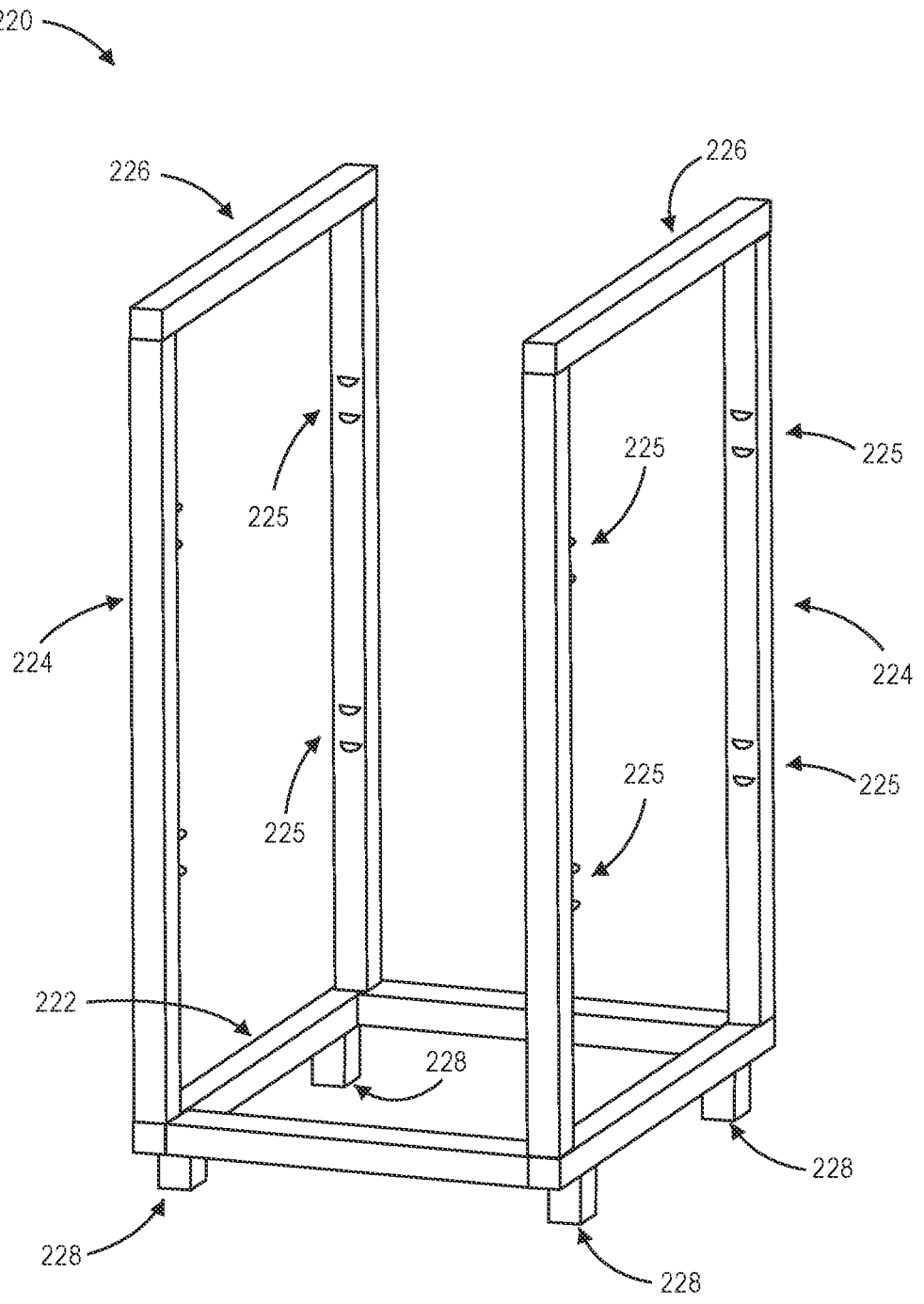
FIG. 2 is a view of aspects of one facility for autonomous ground vehicles in accordance with implementations of the present disclosure.

Referring to FIG. 2, a view of aspects of one facility for autonomous ground vehicles in accordance with implementations of the present disclosure is shown. Except where otherwise noted, reference numerals preceded by the number "2" in FIG. 2 refer to elements that are similar to elements having reference numerals preceded by the number "1" shown in FIGS. 1A through 1F.

As is shown in FIG. 2, a frame 220 of a facility for accommodating one or more autonomous ground vehicles includes a base 222, a plurality of posts (or risers) 224, a pair of supports 226 and a plurality of feet 228.

The base 222 may be formed from a single solid or hollow section, or from two or more of such sections, e.g., by bolting, welding or otherwise joining such sections together to form the base 222. Although the base 222 has a shape of a rectangle (e.g., a square), the base 222 may have any shape, and may be sized and configured to support or accommodate a charging console of the present disclosure or any number of autonomous ground vehicles thereon or therein. The size and the shape of the base 222 may be selected based on a size or a shape of any number of autonomous ground vehicles (e.g., one or more) to be accommodated within a space or an enclosure. Moreover, a shape of the base 222 need not be symmetrical or regular.

The posts 224 may be joined to corners or other portions of the base 222, e.g., at proximal ends of the posts 224, and extend normal to the base 222. The posts 224 may be formed from one or more solid or hollow sections, and bolted, welded or otherwise joined to the base 222 in any manner.

The supports 226 may be joined to distal ends of the posts 224, e.g., by bolting, welding or in any other manner. The supports 226 may enhance the rigidity of the frame 220 and enable one or more objects or components, e.g., a top lid, to be mounted above a space or enclosure defined by the frame 220.

In some implementations, the posts 224 or the supports 226 may include sections having the same dimensions (e.g., cross-sectional areas) or formed from the same materials as the one or more sections from which the base 222 is formed. Alternatively, or additionally, the posts 224 or the supports 226 may include sections having different dimensions (e.g., cross-sectional areas) or formed from different materials, as compared to the one or more sections from which the base 222 is formed.

The feet 228 extend from the base 222 in opposite directions from the posts 224, and are intended to provide contact points for the frame 220 or a facility of which the frame 220 is a part on a ground surface of any type. The feet 228 may be adjustable in any manner to place the frame 220 or any aspect thereof at a desired angle with respect to the ground surface on which the frame 220 rests. In some implementations, one or more of the feet 228 may include levelers or any other adjustable features.

As is shown in FIG. 2, the posts 224 and the feet 228 extend in opposite directions from the base 222, such that when the base is aligned substantially horizontally, each of the posts 224 and each of the feet 228 extends substantially vertically, and in opposite directions from one another.

Although the frame 220 of FIG. 2 includes four posts 224 and four feet 228, the frames of the present disclosure may include any number of posts or feet, or any number of supports extending between or connecting such posts.

As is further shown in FIG. 2, each of the posts 224 is configured to connect with a post of another frame, and thereby join the frame 220 with the other frame, by one or more connections 225. Such connections 225 may include, but need not be limited to bolts, nuts, plates, welds, bores, rivets, hooks, notches or other components or features.

The base 222, the posts 224, the supports 226 and the feet 228 may be formed from any suitable materials, including but not limited to metals (e.g., aluminum or aluminum alloys, machined aluminum, or metals other than aluminum, such as steels), composites, plastics (e.g., thermosetting plastics such as epoxy or phenolic resins, polyurethanes or polyesters, as well as polyethylenes, polypropylenes or polyvinyl chlorides), or any other combinations of materials. Additionally, the base 222, the posts 224, the supports 226 and the feet 228 may be formed by extrusion (e.g., hot or cold), rolling, forging, drawing, bending or shearing, or any other processes, such as injection molding, or any other form of forming or molding (e.g., rotational molding, extrusion molding, vacuum casting, thermoforming, compression molding). Alternatively, or additionally, one or more of the base 222, the posts 224, the supports 226 and the feet 228 may be formed from woods with sufficient strength properties such as ash.

Figure 3A:
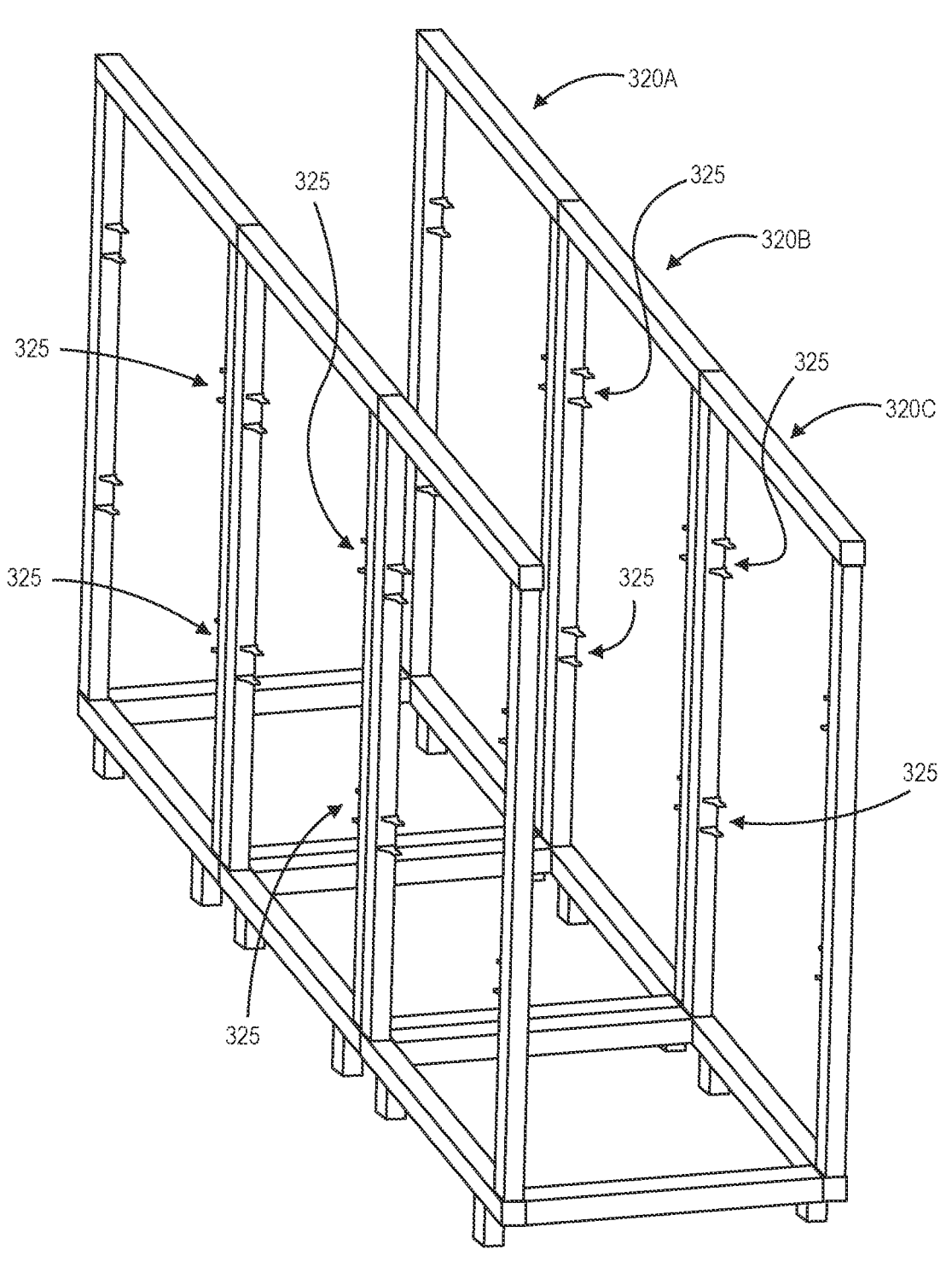
FIGS. 3A through 3C are views of aspects of one system including a facility for autonomous ground vehicles in accordance with implementations of the present disclosure.
Figure 3B:
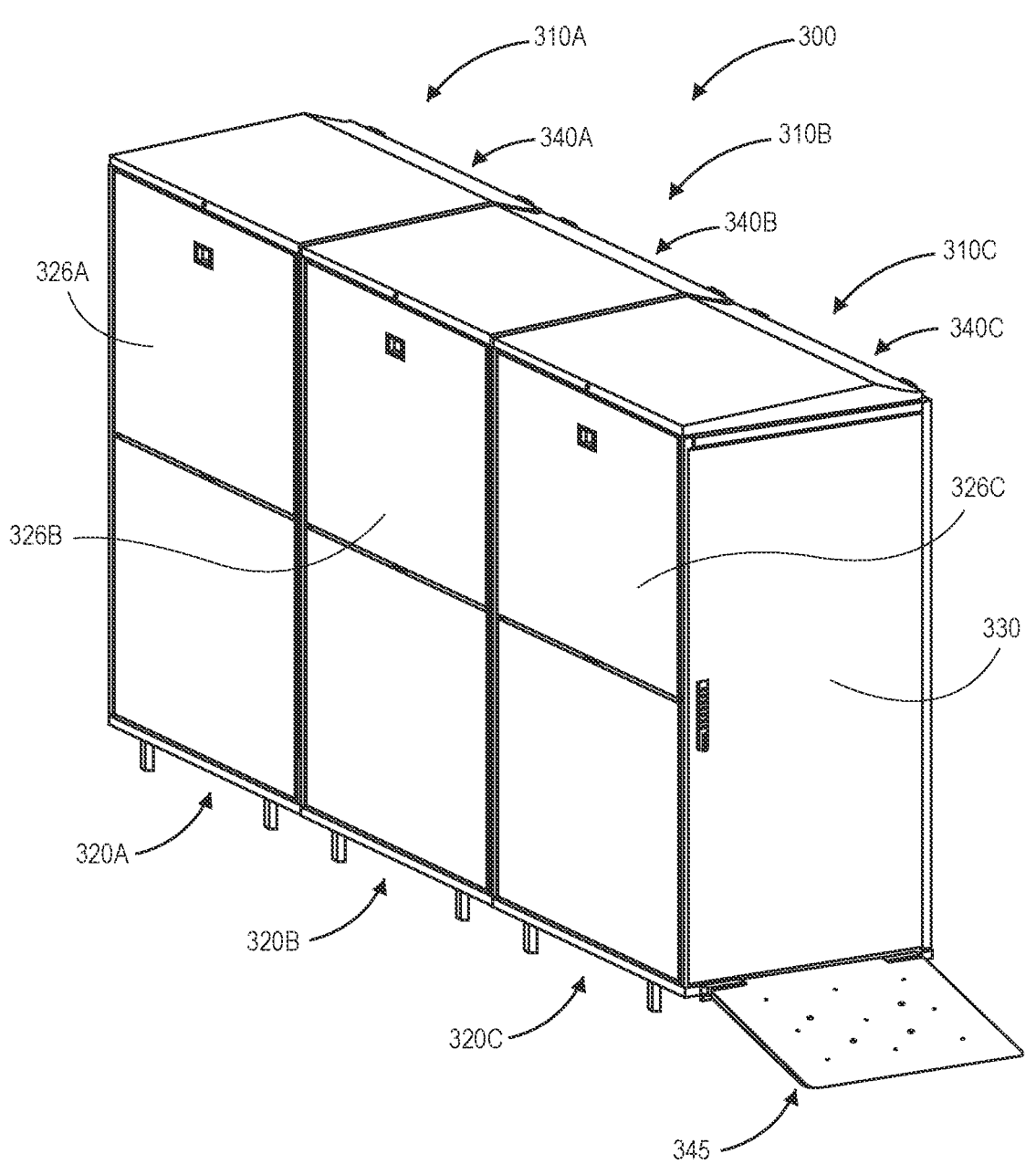
Figure 3C:
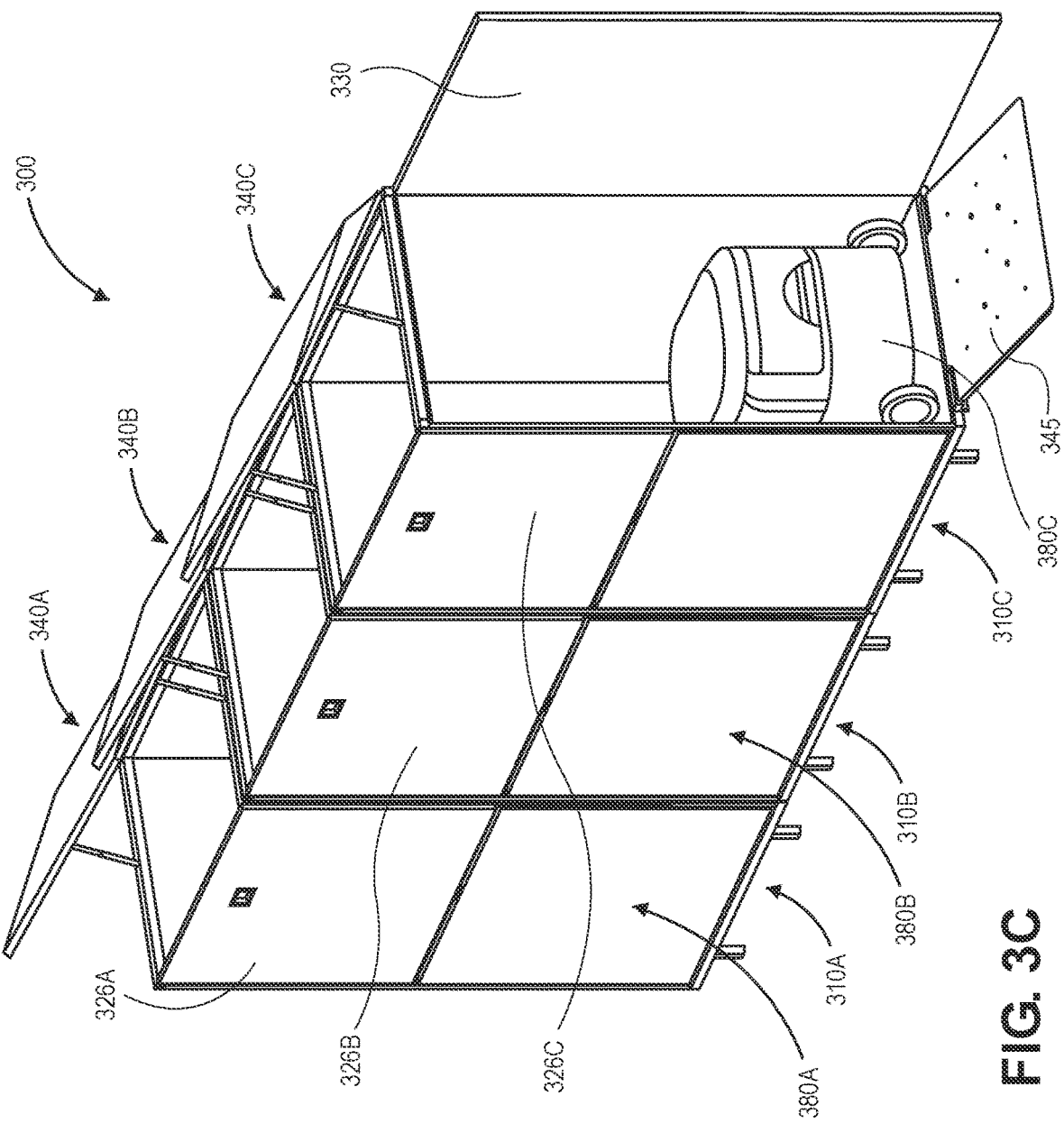

In some implementations of the present disclosure, facilities may be defined or formed to include any number of spaces or enclosures for accommodating autonomous ground vehicles therein, e.g., by combining two or more frames or other components, and mounting panels, doors or other components to such frames. Referring to FIGS. 3A through 3C, views of aspects of one system including a facility for autonomous ground vehicles in accordance with implementations of the present disclosure are shown. Except where otherwise noted, reference numerals preceded by the number "3" in FIGS. 3A through 3C refer to elements that are similar to elements having reference numerals preceded by the number "2" in FIG. 2 or by the number "1" shown in FIGS. 1A through 1F.

As is shown in FIG. 3A, a plurality of frames 320A, 320B, 320C are joined together, e.g., in line or front-to-back, at a plurality of connections 325. For example, each of the frames 320A, 320B, 320C may include a base, a plurality of posts having distal ends joined to the base, and supports extending between distal or free ends of the respective posts. The frames 320A, 320B, 320C are joined such that the supports are commonly aligned in two parallel lines atop the respective posts of the frames 320A, 320B, 320C. Each of the frames 320A, 320B, 320C may further include adjustable feet or other extensions provided below bases of the respective frames 320A, 320B, 320C.

As is shown in FIG. 3B, a facility 300 including spaces (or enclosures) 310A, 310B, 310C may be formed by mounting a plurality of panels or other components to one or more of the frames 320A, 320B, 320C. For example, as is shown in FIG. 3B, a plurality of top lids 340A, 340B, 340C are mounted to upper ends of the respective frames 320A, 320B, 320C, e.g., atop supports extending between pairs of the posts. Additionally, a front door 330 is movably mounted to the frame 320C, e.g., between pairs of posts, and a ramp 345 is provided at a base of the frame 320C. As is further shown in FIG. 3B, side doors 326A, 326B, 326C are also movably mounted to the respective frames 320A, 320B, 320C.

The facility 300 does not include, however, any panels or other components mounted or installed between the frame 320A and the frame 320B, or between the frame 320B and the frame 320C. Thus, any of the spaces 310A, 310B, 310C may be accessed by moving the front door 330 from a closed position, as shown in FIG. 3B, to an open position, or to any intervening position between the closed position and the open position. Each of the spaces 310A, 310B, 310C may be independently accessed, however, by operation of one of the side doors 326A, 326B, 326C, respectively, or by one of the top lids 340A, 340B, 340C, respectively.

As is shown in FIG. 3C, the facility 300 includes an autonomous ground vehicle 380A within the space 310A and an autonomous ground vehicle 380B within the space 310B, as well as an autonomous ground vehicle 380C within the space 310C. The top lids 340A, 340B, 340C are opened above the respective frames 320A, 320B, 320C, to provide access to the respective spaces 310A, 310B, 310C. Alternatively, the side doors 326A, 326B, 326C may be opened adjacent to the respective frames 320A, 320B, 320C, to provide access to the respective spaces 310A, 310B, 310C.

Additionally, the front door 330 is opened to enable the autonomous ground vehicles 380A, 380B, 380C to enter into or depart from the facility 300 by way of the ramp 345. In some implementations, each of the autonomous ground vehicles 380A, 380B, 380C may be aligned on a common set of rails or other structures or surfaces within the facility 300, e.g., above charging consoles (not shown) within the respective spaces 310A, 310B, 310C, such that the autonomous ground vehicle 380C is the last of the vehicles 380A, 380B, 380C to enter the facility 300 and the first of the vehicles 380A, 380B, 380C to depart therefrom.

Figure 4A:
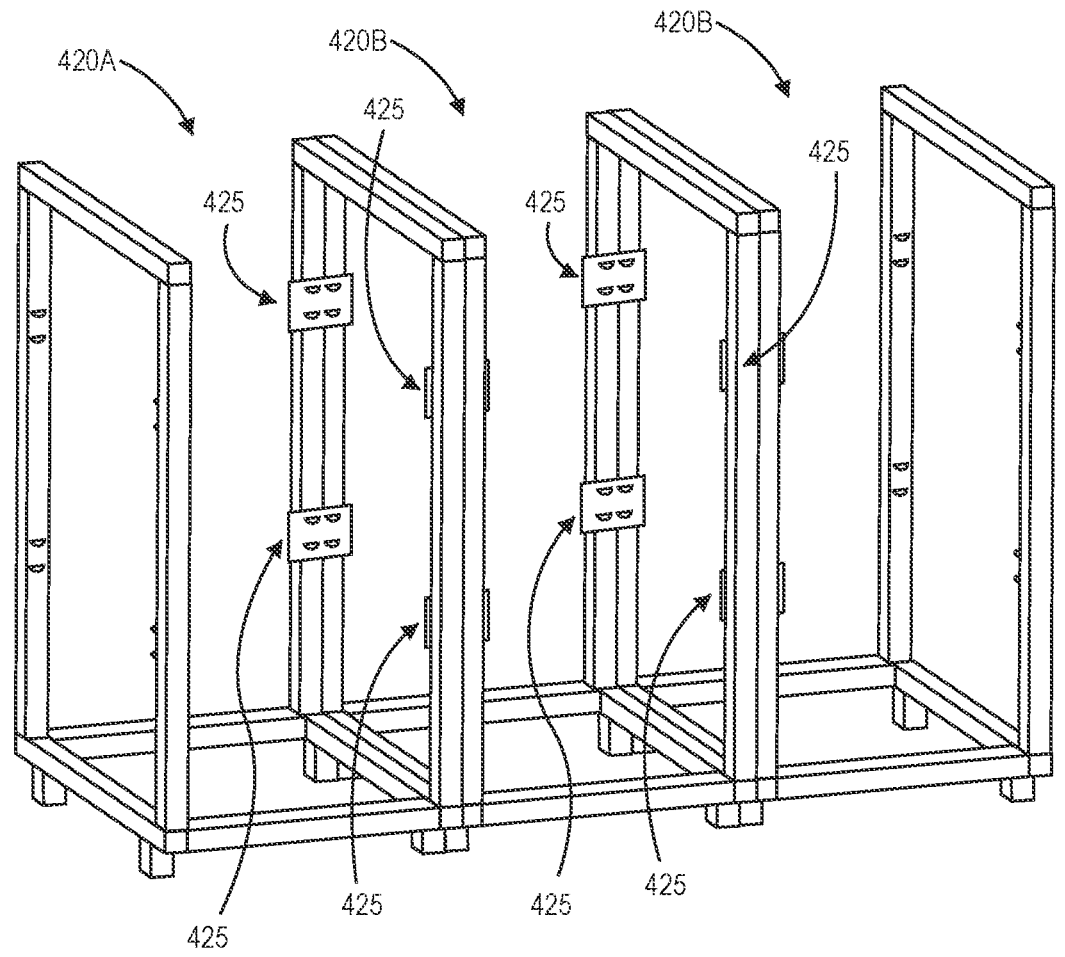
FIGS. 4A through 4C are views of aspects of one system including a facility for autonomous ground vehicles in accordance with implementations of the present disclosure.
Figure 4B:
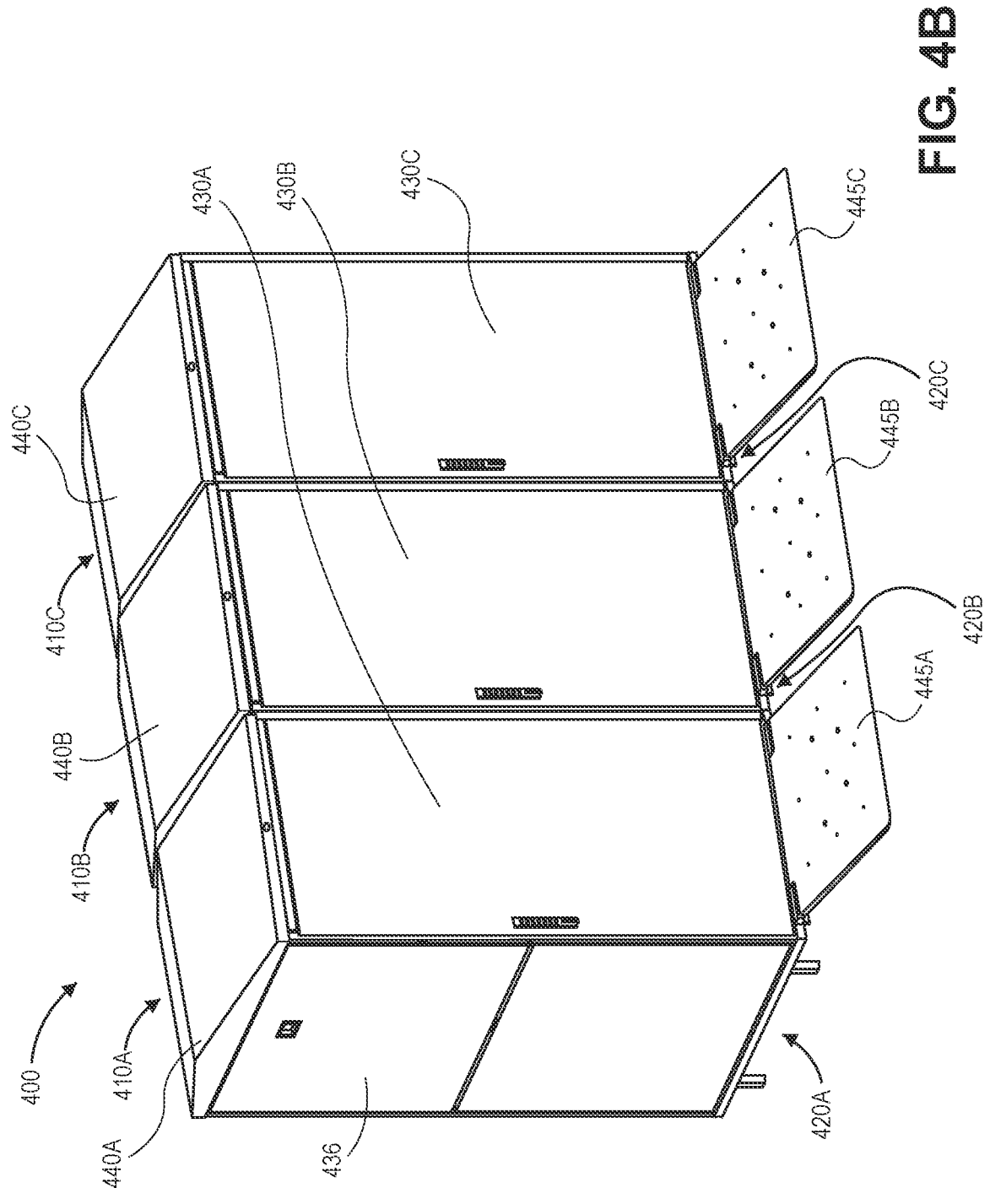
Figure 4C:
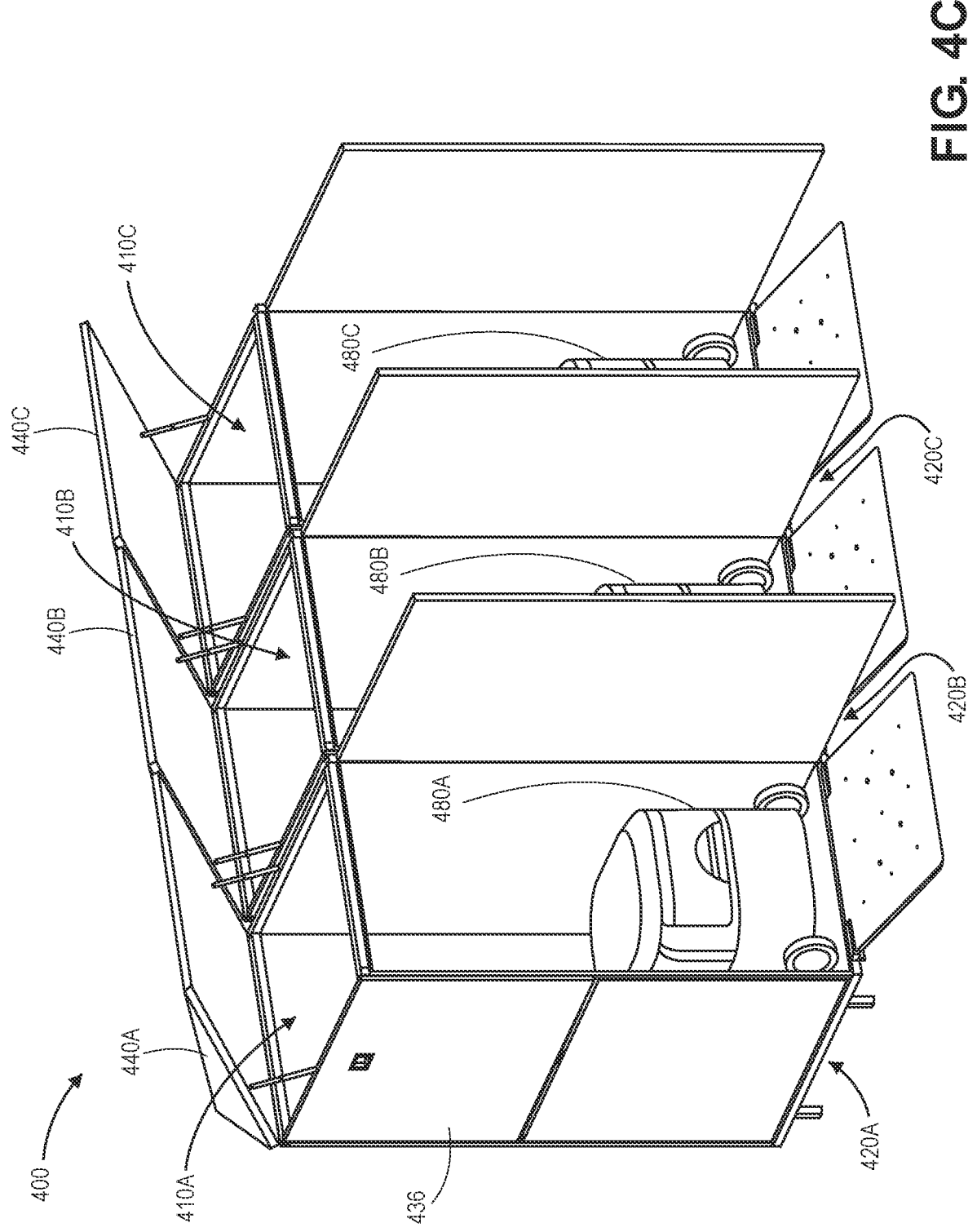

Referring to FIGS. 4A through 4C, views of aspects of one system including a facility for autonomous ground vehicles in accordance with implementations of the present disclosure are shown. Except where otherwise noted, reference numerals preceded by the number "4" in FIGS. 4A through 4C refer to elements that are similar to elements having reference numerals preceded by the number "3" in FIGS. 3A through 3C, by the number "2" in FIG. 2 or by the number "1" shown in FIGS. 1A through 1F.

As is shown in FIG. 4A, a plurality of frames 420A, 420B, 420C are joined together, e.g., side-by-side or adjacent to one another, at a plurality of connections 425. For example, each of the frames 420A, 420B, 420C may include a base, a plurality of posts having distal ends joined to the base, and supports extending between distal or free ends of the respective posts. The frames 420A, 420B, 420C are joined such that the supports are aligned in parallel atop the respective posts of the frames 420A, 420B, 420C. Each of the frames 420A, 420B, 420C may further include adjustable feet or other extensions provided below bases of the respective frames 420A, 420B, 420C. As is further shown in FIG. 4A, each of the connections 425 may include a plate (e.g., a gusset plate, a truss plate, a joint plate, or another plate) to which posts of adjacent frames 420A, 420B, 420C may be joined.

As is shown in FIG. 4B, a facility 400 including spaces (or enclosures) 410A, 410B, 410C may be formed by mounting a plurality of panels or other components to one or more of the frames 420A, 420B, 420C. For example, as is shown in FIG. 4B, a plurality of top lids 440A, 440B, 440C are mounted to upper ends of the respective frames 420A, 420B, 420C, e.g., atop supports extending between pairs of the posts. Additionally, a plurality of front doors 430A, 430B, 430C are movably mounted to the frames 420A, 420B, 420C, e.g., between pairs of posts, and ramps 445A, 445B, 445C are provided at bases of the respective frames 420A, 420B, 420C. As is further shown in FIG. 4B, a side door 436 is also movably mounted to the frame 420A.

The facility 400 does not include, however, any panels or other components mounted or installed between the frame 420A and the frame 420B, or between the frame 420B and the frame 420C. Thus, any of the spaces 410A, 410B, 410C may be accessed by moving the side door 436 from a closed position, as shown in FIG. 4B, to an open position, or to any intervening position between the closed position and the open position. Each of the spaces 410A, 410B, 410C may be independently accessed, however, by operation of one of the front doors 430A, 430B, 430C, respectively, or by one of the top lids 440A, 440B, 440C, respectively.

As is shown in FIG. 4C, the facility 400 includes a plurality of autonomous ground vehicles 480A, 480B, 480C within the spaces 410A, 410B, 410C. The top lids 440A, 440B, 440C are opened above the respective frames 420A, 420B, 420C, to provide access to the respective spaces 410A, 410B, 410C. Alternatively, the side door 436 may be opened adjacent to the frame 420C, to provide access to the spaces 410A, 410B, 410C.

Additionally, any of the front doors 430A, 430B, 430C may be independently opened to enable any of the autonomous ground vehicles 480A, 480B, 480C to independently enter into or depart from the facility 400 by way of the ramps 445A, 445B, 445C. Moreover, the autonomous ground vehicles 480A, 480B, 480C may be aligned on individual sets of rails or other structures or surfaces within the facility 400, e.g., above charging consoles (not shown) within the respective spaces 410A, 410B, 410C.

Facilities of the present disclosure may include any number of spaces or enclosures for accommodating any number of autonomous ground vehicles therein in accordance with implementations of the present disclosure. Although the facility 300 of FIGS. 3B and 3C includes three frames 320A, 320B, 320C joined to one another in line or front-to-back, and three spaces 310A, 310B, 310C accessible by the front door 330, and although the facility 400 of FIGS. 4B and 4C includes three frames 420A, 420B, 420C joined to one another side-by-side, and three spaces 410A, 410B, 410C independently accessible by front doors 430A, 430B, 430C, facilities of the present disclosure may be formed from any number of frames and may include any number of spaces or enclosures. Moreover, facilities of the present disclosure are not limited to the in-line and adjacent orientations or configurations of the spaces 310A, 310B, 310C of the facility 300 of FIGS. 3B and 3C or the spaces 410A, 410B, 410C of the facility 400 of FIGS. 4B and 4C. In some implementations, frames or spaces may be aligned back-to-back, or in any other orientation or configuration with respect to one another, and in any number. For example, in some implementations, a facility may include pairs of sets of spaces in any number aligned in a manner similar to that shown in FIG. 3C, e.g., back-to-back. In some other implementations, a facility may include a set of spaces in any number that are aligned in a manner similar to that shown in FIG. 3C, and another set of spaces in any number that are aligned in a manner similar to that shown in FIG. 4C, e.g., joined to one another in a T-shaped orientation or arrangement.

Figure 5A:
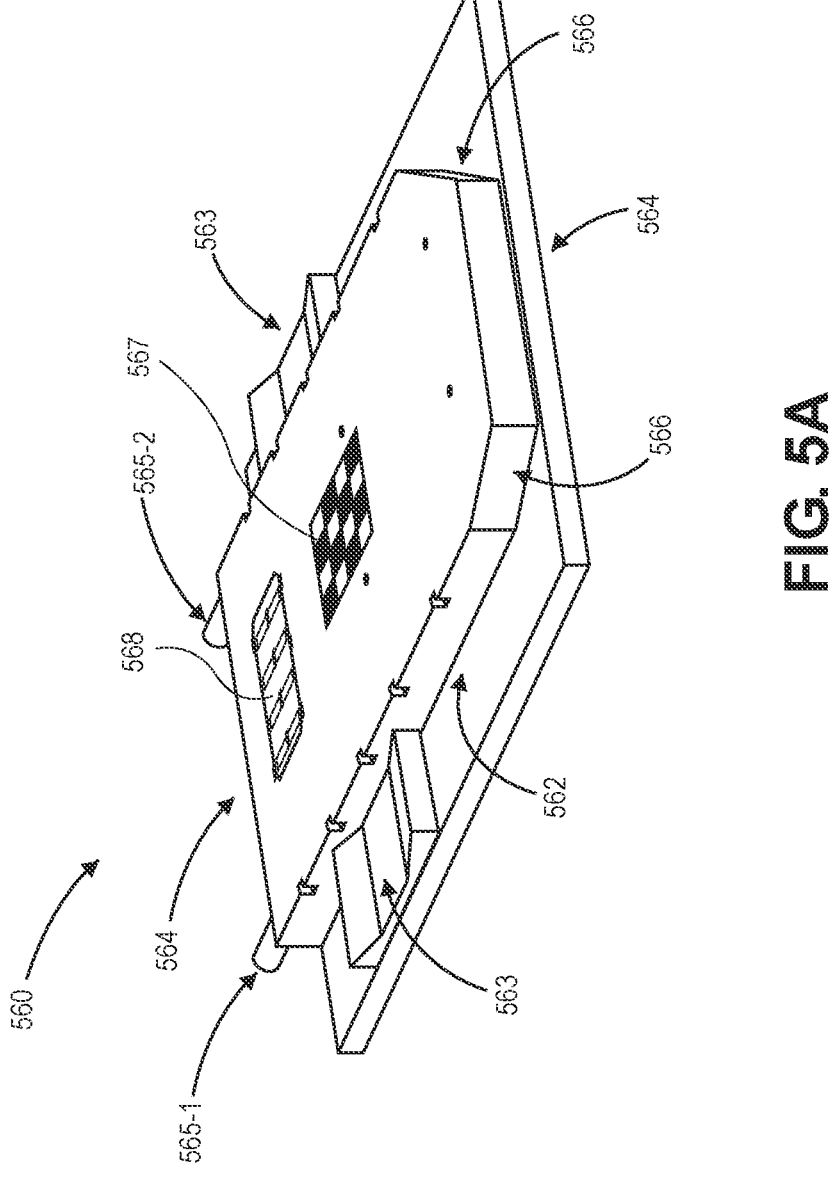
FIGS. 5A and 5B are views of aspects of one charging console for autonomous ground vehicles in accordance with implementations of the present disclosure.
Figure 5B:
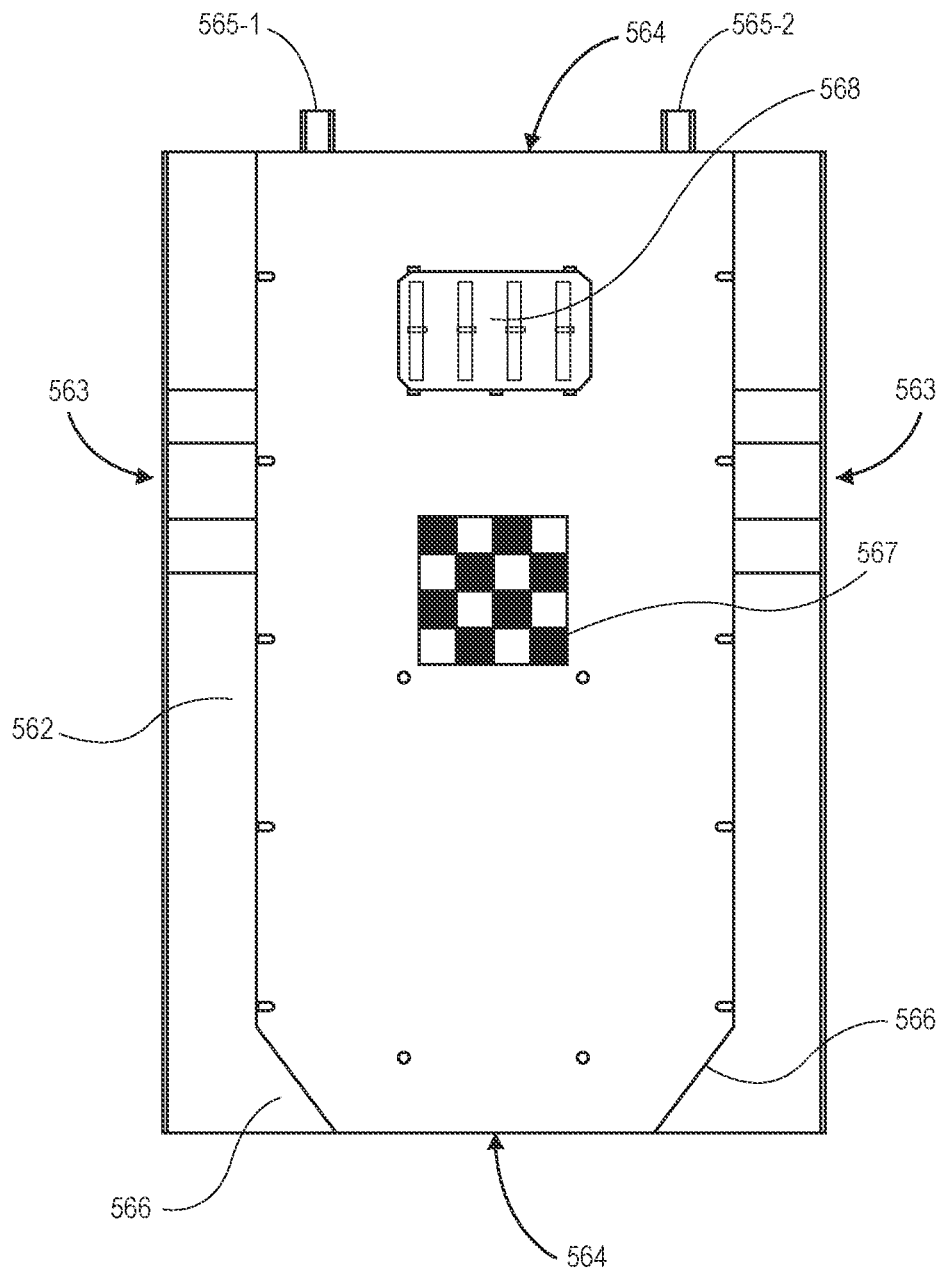

Referring to FIGS. 5A and 5B, views of aspects of one charging console for autonomous ground vehicles in accordance with implementations of the present disclosure is shown. Except where otherwise noted, reference numerals preceded by the number "5" in FIGS. 5A or 5B refer to elements that are similar to elements having reference numerals preceded by the number "4" in FIGS. 4A through 4C, by the number "3" in FIGS. 3A through 3C, by the number "2" in FIG. 2 or by the number "1" shown in FIGS. 1A through 1F.

FIG. 5A is a perspective view of a console 560. FIG. 5B is a top view of the console 560.

As is shown in FIGS. 5A and 5B, the console 560 includes a base 562, a pair of chocks 563, a housing 564, a pair of connections 565-1, 565-2, a fiducial 567 and a charging assembly 568. The housing 564 of the console 560 is substantially rectangular in shape and has a pair of tapered edges 566 provided at one end of the housing 564. Alternatively, in some implementations, the tapered edges 566 may be provided at each end of the housing 564. In some other implementations, however, the housing 564 need not include any tapered edges.

The console 560 may be constructed from any suitable materials in accordance with implementations of the present disclosure. In some implementations, the console 560 may be constructed from aluminum or one or more aluminum alloys, e.g., an aluminum alloy having a sufficiently high fatigue strength and modulus of elasticity. Within the console 560, one or more charging systems or communications equipment (e.g., modems or other components) may be provided, as necessary.

In some implementations, dimensions of the console 560 or the housing 564 may be selected based on dimensions of an autonomous ground vehicle that is expected to use the console 560 for receiving electrical power or for transferring information or data. For example, a height of the housing 564 may be selected based on a clearance of an autonomous ground vehicle, a width of the housing 564 may be selected based on a track (e.g., an axle track) or a gauge of the autonomous ground vehicle, and a length of the housing 564 may be selected based on a length of the autonomous ground vehicle, to enable the autonomous ground vehicle to be parked above the housing 564 within a space of a facility.

The chocks 563 are provided on either side of the housing 564, e.g., on upper surfaces of the base 562. The chocks 563 may be raised protrusions or extensions provided on the base

562 that may provide limited resistance to rolling with an autonomous ground vehicle 580 resting on the base 562, and above the housing 564. For example, upon entering a space or enclosure including the console 560, the autonomous ground vehicle may drive in a powered manner to cause one wheel to enter each of the chocks 563. When the autonomous ground vehicle is no longer operating, however, the chocks 563 may maintain the autonomous ground vehicle in a substantially fixed alignment with respect to the housing 564, and prevent the autonomous ground vehicle from rolling.

The chocks 563 may be formed from any suitable material in accordance with implementations of the present disclosure, e.g., metals such as aluminum or steel, plastics, composites, rubbers or others. In some implementations, the chocks 563 may be integral components or portions of the base 562 or the housing 564. In other implementations, the chocks 563 may be formed independently and joined to the base 562 or the housing 564 in any manner, e.g., by rivets, nails, screws, bolts or any other systems or components, as well as any glues or adhesives.

Although the console 560 of FIGS. 5A and 5B includes only a single pair of chocks 563, e.g., one chock 563 on either side of the housing 564, consoles of the present disclosure may include any number of chocks, such as a single chock on one side of the housing 564, or multiple chocks on either side of the housing 564.

As is further shown in FIGS. 5A and 5B, the console 560 includes a power connection 565-1 and a network connection 565-2 provided at one end of the housing 564, e.g., at an end of the housing 564 opposite an end including the tapered edges 566. The power connection 565-1 may be configured to receive electrical power for powering autonomous ground vehicles from any power source, or from one or more other charging consoles (not shown). The network connection 565-2 may be configured to connect with one or more external computer systems (not shown), to enable an autonomous ground vehicle or the console 560 to communicate via wired technologies such as Universal Serial Bus (or "USB") or fiber optic cable, or others. Alternatively, in some implementations, such as where the console 560 includes one or more wireless transceivers or other communications components provided within the housing 564, the network connection 565-2 need not be provided.

Thus, where the console 560 is mounted within a space or enclosure of a facility for accommodating autonomous ground vehicles therein, the end of the housing 564 including the pair of tapered edges 566 may be aligned nearest an entrance to the space or enclosure, such that wheels of the autonomous ground vehicle that are not perfectly aligned with respect to sides of the housing 564 upon entering the space or enclosure may be realigned by contact with the tapered edges 566. Likewise, the end of the housing 564 including the power connection 565-1 and the network connection 565-2 may be aligned farthest from the entrance to the space or enclosure, e.g., nearest a back of the space of the enclosure, where the console 560 may connect to one or more cables or connectors for receiving electrical power.

The fiducial 567 may be one or more alphanumeric characters, symbols, bar codes (e.g., one-dimensional or two-dimensional bar codes, such as "QR" codes) or other markings or indicia that may be recognized by one or more sensors (such as a camera) provided aboard an autonomous ground vehicle that passes over the console 560. The autonomous ground vehicle may detect the fiducial 567 within an image or other data captured by such sensors, and determine a position and/or an orientation of the autonomous ground vehicle with respect to the housing 564 based on the appearance of the fiducial 567 within such images.

As is also shown in FIGS. 5A and 5B, the console 560 includes a charging assembly 568 for transferring electrical power to an autonomous ground vehicle. In some implementations, the console 560 may include one or more contact points, which may be spring-loaded or configured in any other manner and aligned for contact with one or more corresponding contact points of an autonomous ground vehicle to conductively transfer power to the autonomous ground vehicle thereby. In some implementations, the assembly 568 may be configured to transfer electrical power by electromagnetic induction, e.g., where the autonomous ground vehicle includes a corresponding charging component for receiving electrical power from the assembly 568 in a wireless manner. Alternatively, the console 560 may be configured to transfer electrical power to the autonomous ground vehicle in any other manner.

In some implementations, the console 560 may be mounted to a base or any other component of a frame within a space or enclosure of a facility in any manner. For example, the console 560 may be mounted to a base by one or more flanges, brackets or other systems using rivets, nails, screws, bolts or any other systems or components, as well as any glues or adhesives, in a manner that permits an autonomous ground vehicle to enter a space or enclosure including the console 560 and to roll or drive over the console 560 to place one or more charging contacts of the autonomous ground vehicle in contact with or within a vicinity of one or more charging contacts of the console 560. Alternatively, or additionally, one or more wheel chocks or other systems for releasably maintaining an autonomous ground vehicle in a desired position may be provided on the base 562 or the housing 564, as necessary.

Charging consoles of the present disclosure may be configured to receive electrical power of any type or form and transfer the electrical power to autonomous ground vehicles. In some implementations, facilities of the present disclosure may include power cabinets or power interfaces that may be readily connected to one or more power sources and to charging consoles, which may operate via single-phase alternating current (or "AC") electrical power, three-phase AC power, or DC power, and at any relevant or applicable voltage levels, e.g., 200-240 volts.

Figure 6:
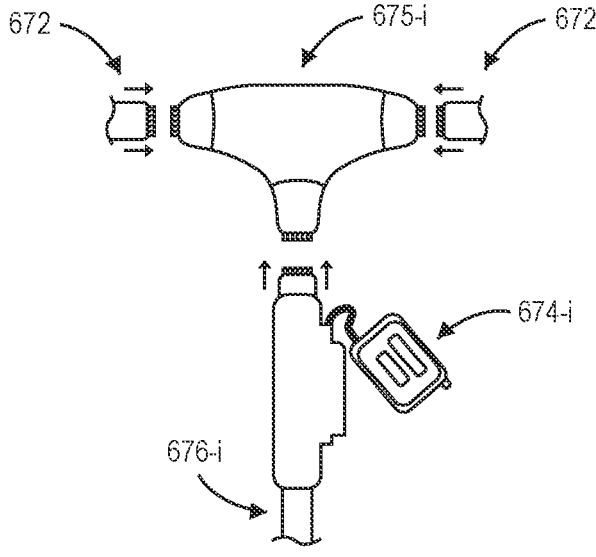
FIG. 6 is a view of aspects of one facility for autonomous ground vehicles in accordance with implementations of the present disclosure.
Figure 6:
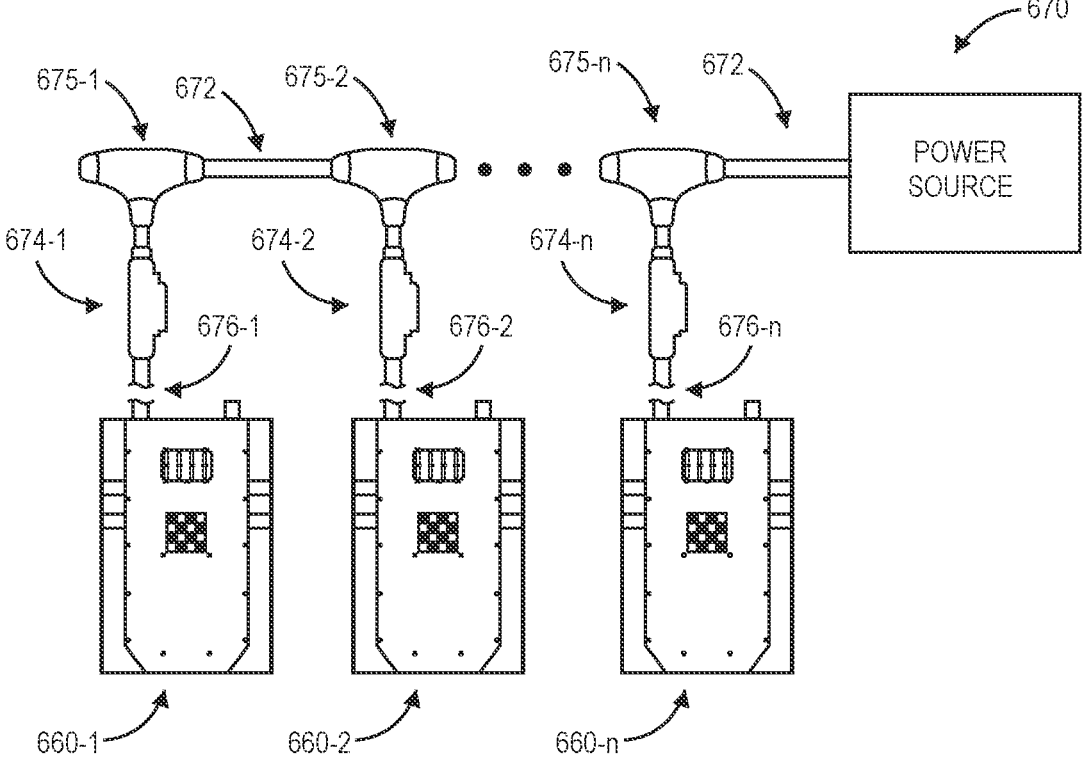

Referring to FIG. 6, a view of aspects of one facility for autonomous ground vehicles in accordance with implementations of the present disclosure is shown. Except where otherwise noted, reference numerals preceded by the number "6" in FIG. 6 refer to elements that are similar to elements having reference numerals preceded by the number "5" in FIG. 5A or 5B, by the number "4" in FIGS. 4A through 4C, by the number "3" in FIGS. 3A through 3C, by the number "2" in FIG. 2 or by the number "1" shown in FIGS. 1A through 1F.

As is shown in FIG. 6, a representative bus connector 675-i is shown. The bus connector 675-i is configured to connect to bus cables 672 and also a power cable 676-i for providing power to a console or another aspect of a facility. The power cable 676-i may include an in-line fuse 674-i or, alternatively, a breaker or a switch, or any other component for providing overcurrent protection for an autonomous ground vehicle.

As is further shown in FIG. 6, any number of the bus connector 675-i may be utilized to provide electrical power to consoles. For example, a plurality of bus connectors 675-1, 675-2 . . . 675-n may be connected to a power source 670 and one another in series, or in a "daisy chain," by way of a plurality of bus cables 672. A plurality of consoles 660-1, 660-2 . . . 660-*n* may each be connected to one of the bus connectors 675-1, 675-2 . . . 675-*n* by a power cable 676-1, 676-2 . . . 676-*n*, which may extend into a space or an enclosure of a facility including one or more of such consoles 660-1, 660-2 . . . 660-*n*. Properties of the bus connectors 675-1, 675-2 . . . 675-*n* or the power cables 676-1, 676-2 . . . 676-*n* (e.g., power ratings, maximum voltage or amperage, or others) may be selected based on a number of consoles that may be utilized in connection with a facility, a number of such facilities, or on any other basis.

In some implementations, facilities or spaces (or enclosures) may receive electrical power in groups, e.g., by a power cabinet having a group breaker for each group, and may transfer electric power to each of the spaces or enclosures by way of a distribution box having individual breakers or switches and receptacles provided therein.

Figure 7B:
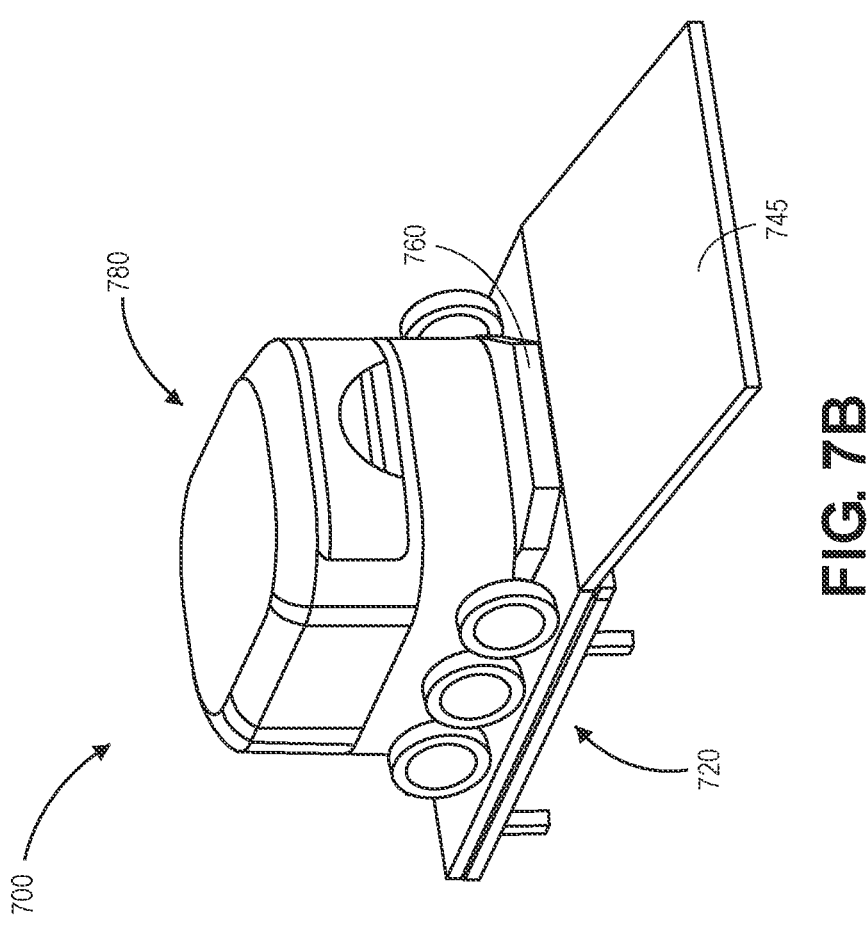
FIGS. 7A and 7B are views of aspects of one system including a facility and a charging console for autonomous ground vehicles in accordance with implementations of the present disclosure.
Figure 7A:
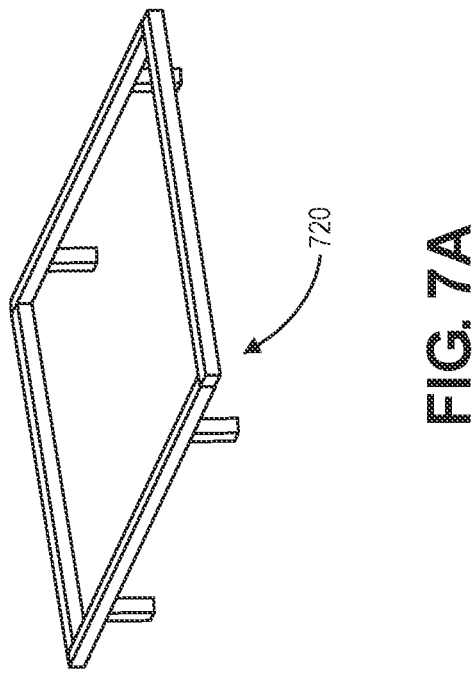

Charging consoles of the present disclosure may also be utilized in the absence of a space or enclosure. Referring to FIGS. 7A and 7B, views of aspects of one system including a facility and a charging console for autonomous ground vehicles in accordance with implementations of the present disclosure are shown. Except where otherwise noted, reference numerals preceded by the number "7" in FIG. 7A or 7B refer to elements that are similar to elements having reference numerals preceded by the number "6" in FIG. 6, by the number "5" in FIG. 5A or 5B, by the number "4" in FIGS. 4A through 4C, by the number "3" in FIGS. 3A through 3C, by the number "2" in FIG. 2 or by the number "1" shown in FIGS. 1A through 1F.

As is shown in FIG. 7A, a frame 720 includes a plurality of feet but does not include any posts (or risers), or supports. The frame 720 includes a base having a shape of a rectangle (e.g., a square) and may be formed from a single solid or hollow section, or from two or more of such sections, e.g., by bolting, welding or otherwise joining such sections together.

As is shown in FIG. 7B, a facility 700 for accommodating an autonomous ground vehicle 780 may include a transition surface 745 (e.g., a ramp or a set of stair) leading to a charging console 760 installed on or mounted to the frame 720. Thus, even in the absence of such posts (or risers), or panels or doors mounted to such posts (or risers), the facility 700 may be provided for use in transferring electrical power to autonomous ground vehicles, or enabling the transfer of information or data to or from the autonomous ground vehicles. The facility 700 may be preferred for use in environments that include sufficient security controls, such that panels or doors need not be provided to ensure that the autonomous ground vehicles are secure while charging or transferring information or data.

Figure 8A:
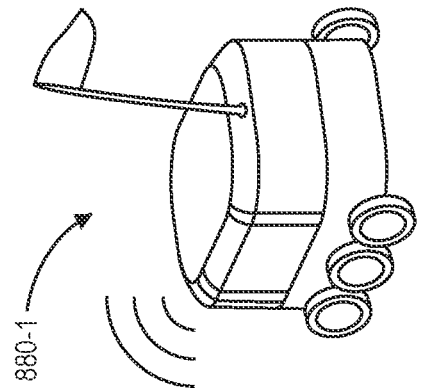
FIGS. 8A and 8B are views of aspects of one system including a facility and charging consoles for autonomous ground vehicles in accordance with implementations of the present disclosure.
Figure 8A:
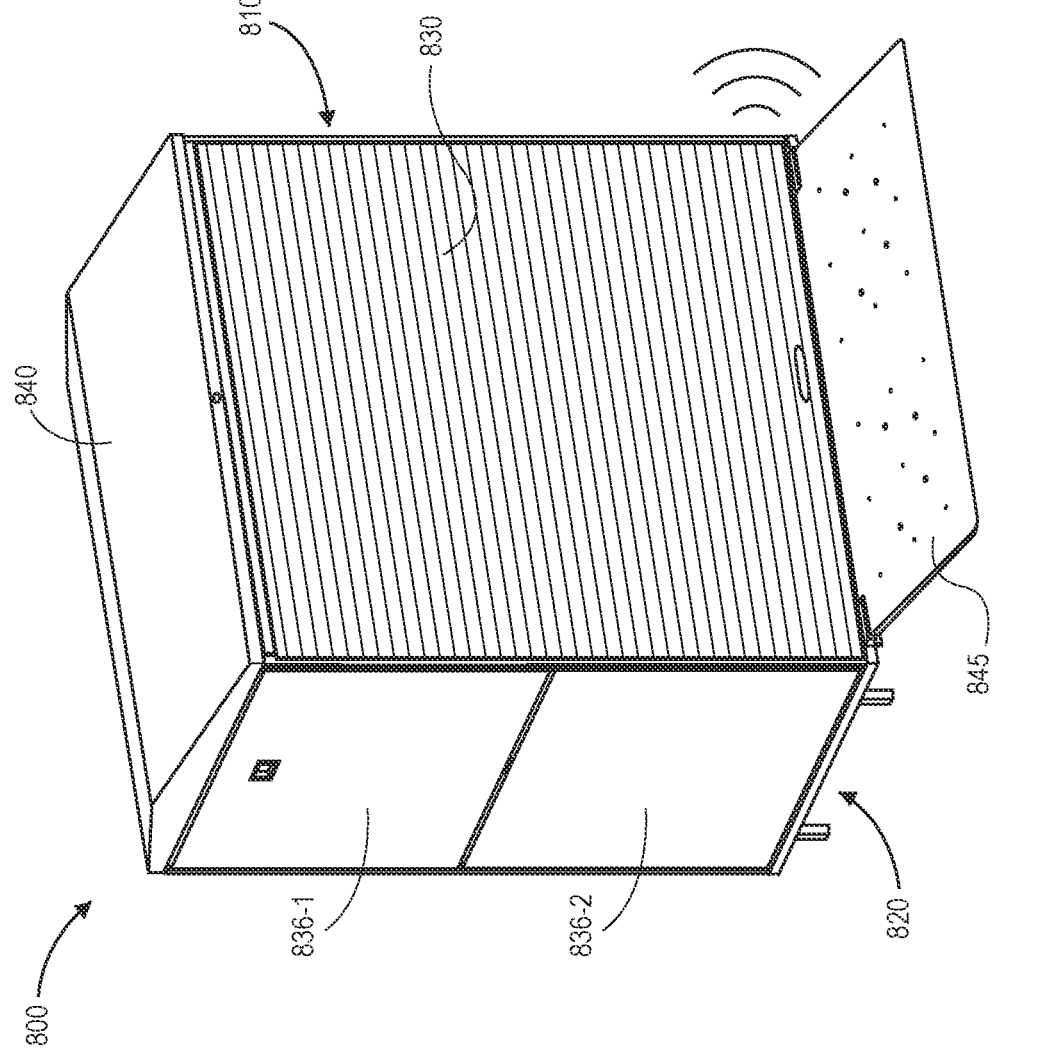
Figure 8B:
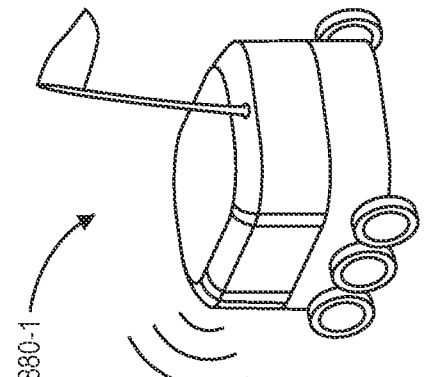
Figure 8B:
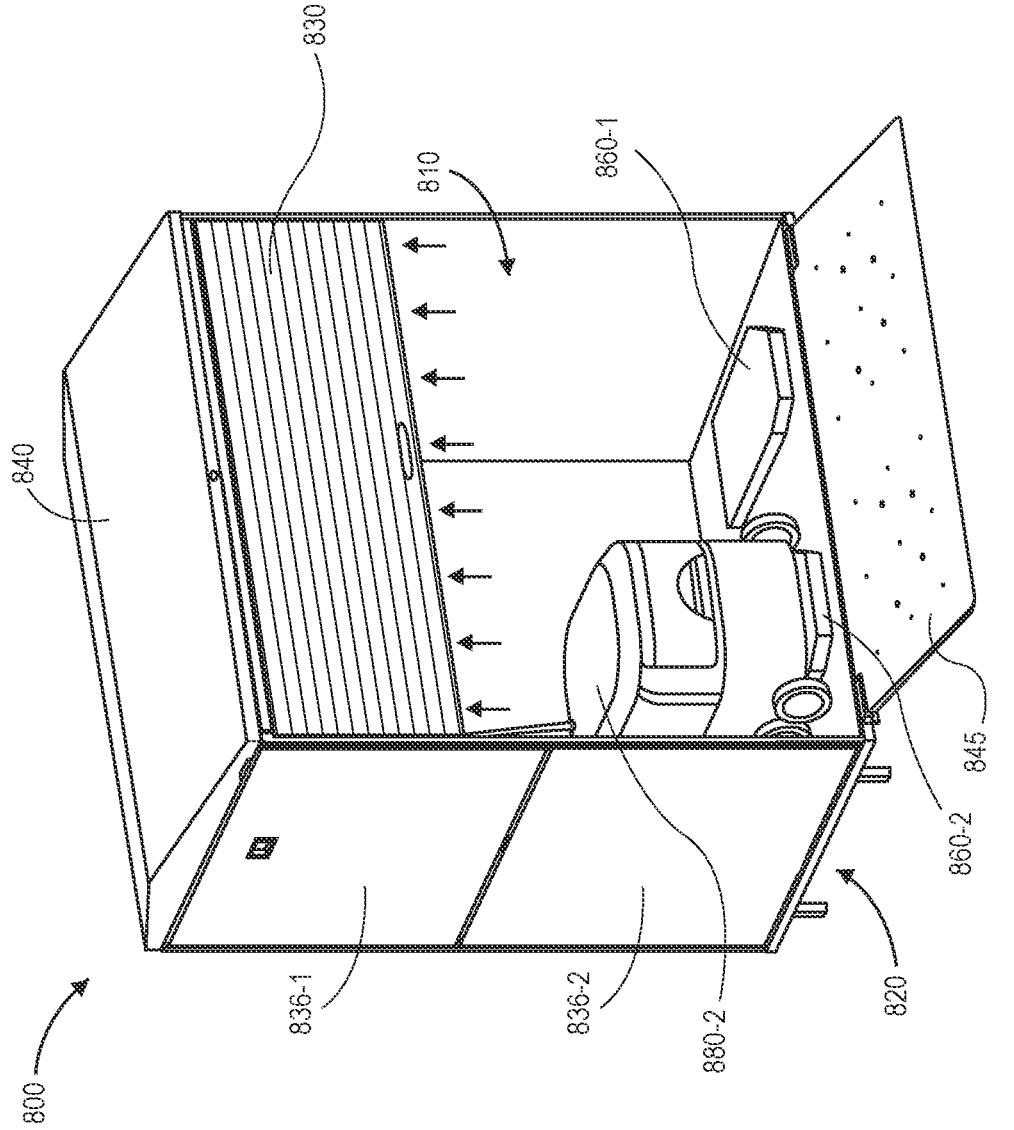

Facilities of the present disclosure need not be symmetrical or regular in shape, and may accommodate multiple autonomous ground vehicles within a common space or enclosure. Referring to FIGS. 8A and 8B, views of aspects of one system including a facility and charging consoles for autonomous ground vehicles in accordance with implementations of the present disclosure are shown. Except where otherwise noted, reference numerals preceded by the number "8" in FIG. 8A or 8B refer to elements that are similar to elements having reference numerals preceded by the number "7" in FIG. 7A or 7B, by the number "6" in FIG. 6, by the number "5" in FIG. 5A or 5B, by the number "4" in FIGS. 4A through 4C, by the number "3" in FIGS. 3A through 3C, by the number "2" in FIG. 2 or by the number "1" shown in FIGS. 1A through 1F.

As is shown in FIG. 8A, a facility 800 includes a space (or an enclosure) 810 for accommodating one or more autonomous ground vehicles therein. The facility 800 is formed from, and the space 810 is defined by, a frame 820, a front door 830, a rear panel 832, a side panel 834, and a side door 836-1 provided above a side panel 836-2. The facility 800 further includes a top lid (or a top cover) 840 and a ramp (or another transition surface) 845 adjacent the front door 830.

The frame 820 is formed by a rectangular base having a length and a width, with the length being approximately twice as long as the width.

The front door 830 may be a rollable, sectioned feature (e.g., a roll-up door) that may be movably mounted to the frame 820, and operated to enable access to the space 810 by autonomous ground vehicles, humans, or any other objects or entities. The front door 830 may be secured in a closed position (e.g., locked) by one or more mechanical, electrical or magnetic systems, such as a lock, an interlock, or another access control system, to provide or define a wall, a boundary or another barrier of the space 810. The front door 830 may also be enabled to be placed in an open position, or in any intervening position between the open position and the closed position, where the lock, the interlock or the other access control system releases or enables at least a portion of the front door 830 to be translated vertically upward or downward in a rolling fashion.

As is shown in FIG. 8A, an autonomous ground vehicle 880-1 approaches the facility 800 and engages in an authentication process, e.g., by transmitting one or more keys or other information or data to any components within the facility 800. As is shown in FIG. 8B, upon authenticating the autonomous ground vehicle 880-1, or otherwise determining that the autonomous ground vehicle 880-1 is permitted to enter the facility 800, the front door 830 may open vertically. With the front door 830 in the open position, or in an intervening position providing sufficient clearance, the autonomous ground vehicle 880-1 may enter the space 810 within the facility 800, e.g., by traveling up the ramp 845, and come to a stop over a console 860-1 to begin receiving electrical power therefrom, or engage in unidirectional or bidirectional communication with one or more external computer systems or devices over one or more networks. Additionally, as is also shown in FIG. 8B, an autonomous ground vehicle 880-2 that is also within the space 810 and at rest over a console 860-2 may depart from the facility 800, e.g., by traveling down the ramp 845.

Although some of the implementations of the present disclosure depict deliveries of items to destinations by one or more autonomous ground vehicles, those of ordinary skill in the pertinent arts will recognize that the systems and methods of the present disclosure are not so limited. Rather, the systems and methods of the present disclosure may be utilized in connection with any type of operations of one or more autonomous ground vehicles, and are not limited to deliveries of items. For example, although some of the implementations described herein make reference to "autonomous ground vehicles," the facilities and consoles described herein may be utilized in connection with any type of ground vehicle, regardless of a manner or system by which such ground vehicles are guided, operated or powered, e.g., autonomously or otherwise.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, left-most digit(s) of a reference number identify a figure in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A facility comprising:
a first frame, wherein the first frame comprises:
    a first base having a rectangular shape;
    a first plurality of posts extending vertically above the first base; and
    at least a first foot extending vertically below the first base;
a second frame, wherein the second frame comprises:
    a second base having a rectangular shape;
    a second plurality of posts extending vertically above the second base; and
    at least a second foot extending vertically below the second base;
a first panel fixedly mounted between two of the first plurality of posts of the first frame;
a first door mounted between two of the first plurality of posts of the first frame, wherein the first door is configured to rotate about a vertical axis between an open position and a closed position;
a second panel fixedly mounted between two of the second plurality of posts of the second frame;
a second door mounted between two of the second plurality of posts of the second frame, wherein the second door is configured to rotate about a vertical axis between an open position and a closed position;
a first console provided within a first space defined at least in part by the first frame, the first panel and the first door, wherein the first console is mounted to the first base, wherein the first console comprises a first charging contact and wherein the first console is configured to transfer power via the first charging contact; and
a second console provided within a second space defined at least in part by the second frame, the second panel and the second door, wherein the second console is mounted to the second base, wherein the second console comprises a second charging contact, and wherein the second console is configured to transfer power via the second charging contact,
wherein the first console is configured to receive electrical power from one of an external power source or the second console, and wherein the second console is configured to receive electrical power from one of the external power source or the first console.

2. The facility of claim 1, wherein the facility rests on a ground surface with at least the first foot and the second foot in contact with the ground surface, wherein the facility further comprises:

a first ramp aligned with the first door, wherein the first ramp extends from the ground surface to a portion of the first base associated with the first door, and wherein the first ramp provides rolling access to the first space; and a second ramp aligned with the second door, wherein the second ramp extends from the ground surface to a portion of the second base associated with the second door, and wherein the second ramp provides rolling access to the second space.

3. The facility of claim 1, wherein a shape and a size of the first base corresponds to a footprint of at least a first ground vehicle, and wherein a shape and a size of the second base corresponds to a footprint of at least a second ground vehicle.

4. A facility comprising:

a first frame comprising:

a first base;

a first post extending normal to the first base; and a first foot extending normal to the first base, wherein the first post and the first foot extend normal to the first base in opposite directions;

a first panel mounted to at least the first post;

a first door rotatably mounted to at least the first post, wherein the first door is adapted to rotate about a vertical axis between a closed position and an open position; and a first console comprising a housing and a power conversion unit disposed within the housing, wherein the first frame, the first panel and the first door define a first space, wherein access to the first space is enabled when the first door is in the open position, wherein the first console is mounted to the first base within the first space, and wherein the first console is configured to transfer electrical power into the first space.

5. The facility of claim 4, wherein the first frame further comprises a first plurality of posts extending normal to the first base, wherein the first post is one of the first plurality of posts, wherein the first panel is mounted between the first post and a second post of the first plurality of posts, and wherein the first door is rotatably mounted between the first post and a third post of the first plurality of posts.

6. The facility of claim 5, wherein the first door comprises a first hinge mounted to the first post, wherein the first door is rotatably mounted to the first post by the first hinge, and wherein the first door has a height corresponding to a height of the first post.

7. The facility of claim 5, wherein the first door comprises a first hinge mounted to the first post, wherein the first door is rotatably mounted to the first post by the first hinge, wherein the first door has a height corresponding to one-half of a height of the first post, and wherein the facility further comprises:

a second panel mounted to at least the first post, wherein the first door is mounted above the second panel, and wherein a height of the second panel corresponds to one-half of the height of the first post.

8. A facility comprising:

a first frame comprising:

a first base;

a first plurality of posts extending normal to the first base; and a first foot extending normal to the first base, wherein a first post of the first plurality of posts and the first foot extend normal to the first base in opposite directions;

a first panel mounted between the first post and a second post of the first plurality of posts;

a first door rotatably mounted between the first post and a third post of the first plurality of posts, wherein the first door is adapted to rotate about a vertical axis between a closed position and an open position; and a first console mounted to the first base, wherein the first frame, the first panel and the first door define a first space, wherein access to the first space is enabled when the first door is in the open position, wherein the first console is disposed within the first space, and wherein the first console is configured to transfer electrical power into the first space;

a second frame comprising:

a second base;

a second plurality of posts, wherein each of the second plurality of posts extends normal to the second base; and a second foot extending normal to the second base, wherein the second plurality of posts and the second foot extend normal to the second base in opposite directions;

a second panel mounted to at least a fourth post of the second plurality of posts;

a second door rotatably mounted to at least a fifth post of the second plurality of posts, wherein the second door is adapted to rotate about a vertical axis between a closed position and an open position; and a second console mounted to the second base, wherein the second frame, the second panel and the second door define a second space, wherein access to the second space is enabled when the second door is in the open position, wherein the second console is disposed within the second space, and wherein the second console is configured to transfer electrical power into the second space.

9. The facility of claim 4, wherein the facility rests on a ground surface with at least the first foot in contact with the ground surface, wherein the facility further comprises:

a first ramp aligned with the first door, wherein the first ramp extends from the ground surface to a portion of the first base associated with the first door, and wherein the first ramp provides rolling access to the first space.

10. The facility of claim 4, wherein the first frame comprises a plurality of sections, wherein each of the plurality of sections is formed at least in part from a steel, wherein the plurality of sections define a shape of a rectangle, and wherein the first post is mounted to one corner of the rectangle.

11. The facility of claim 4, further comprising a hinged lid mounted to at least the first post above the first space, wherein the hinged lid is adapted to move between a closed position and an open position, and wherein access to the first space is enabled when the hinged lid is in the open position.

12. The facility of claim 4, wherein a shape and a size of the first base corresponds to a footprint of a ground vehicle, and wherein a width of the first door is greater than a width of the ground vehicle.

13. The facility of claim 4, wherein the housing is formed at least in part from an aluminum alloy.

14. The facility of claim 4, wherein the power conversion unit is configured to receive electrical power at one of a first voltage level or a first current level from one of an external power source or a second console, and wherein the power conversion unit is configured to transfer electrical power at one of a second voltage level or a second current level into the first space.

15. The facility of claim 14, wherein the housing comprises a power connection at a first end of the housing and a pair of tapered edges at a second end of the housing, wherein the power conversion unit is configured to receive electrical power at the one of the first voltage level or the first current level via the power connection.

16. The facility of claim 4, wherein the power conversion unit is configured to transfer power into the first space by one of:

an inductive charging component provided on an upper surface of the housing; or a conductive charging component provided on the upper surface of the housing.

17. The facility of claim 4, wherein the housing has a length corresponding to a length of a ground vehicle, a height not greater than a clearance of the ground vehicle, and a width not greater than an axle track of the ground vehicle.

18. A system comprising:

a charging console;

a frame;

at least one panel; and at least one door, wherein the charging console comprises:

a housing comprising:

a power conversion unit disposed within the housing, wherein the power conversion unit is configured to receive electrical power at one of a first voltage level or a first current level from one of an external power source or another charging console and to transfer electrical power at one of a second voltage level or a second current level to a ground vehicle; and a transceiver disposed within the housing;

a base, wherein the housing is mounted to the base, and wherein the base is mounted to the frame; and a power connector provided at a first end of the housing, wherein the power conversion unit is configured to receive the electrical power at the one of the first voltage level or the first current level via the power connector, wherein the housing comprises a pair of tapered edges at a second end of the housing, wherein the housing has a length corresponding to a length of the ground vehicle, a height not greater than a clearance of the ground vehicle, and a width not greater than an axle track of the ground vehicle, and wherein each of the housing and the base is formed from an aluminum alloy; and wherein the frame comprises:

a plurality of posts extending vertically above the base, wherein the at least one panel is mounted between two of the plurality of posts and the at least one door is mounted between two of the plurality of posts; and a plurality of feet extending vertically below the base, wherein the charging console is disposed within a space defined by the frame, the at least one panel and the at least one door.

19. The system of claim 18, further comprising at least one of:

an inductive charging component provided on an upper surface of the housing; or a conductive charging component provided on the upper surface of the housing, wherein the power conversion unit is configured to transfer electrical power at the one of the second voltage level or the second current level to the ground vehicle within the housing via the at least one of the inductive charging component or the conductive charging component.

20. The facility of claim 1, wherein the first console comprises a first housing and a first power conversion unit disposed within the first housing, wherein the first housing has a first length corresponding to a length of a first ground vehicle, a first height not greater than a clearance of the first ground vehicle, and a first width not greater than an axle track of the first ground vehicle, wherein the second console comprises a second housing and a second power conversion unit disposed within the second housing, and wherein the second housing has a second length corresponding to one of the length of the first ground vehicle or a length of a second ground vehicle, a second height not greater than the clearance of the first ground vehicle or a clearance of the second ground vehicle, and a second width not greater than the axle track of the first ground vehicle or an axle track of the second ground vehicle.

* * * * *